(12) United States Patent
Murata et al.

(10) Patent No.: US 7,982,940 B2
(45) Date of Patent: Jul. 19, 2011

(54) PARTICLE FOR DISPLAY MEDIUM AND INFORMATION DISPLAY PANEL UTILIZING THE SAME

(75) Inventors: Kazuya Murata, Hino (JP); Takao Ohuchi, Hamura (JP); Hajime Kitano, Kunitachi (JP)

(73) Assignee: Bridgestone Corporation, Tokyo (JP)

( * ) Notice: Subject to any disclaimer, the term of this patent is extended or adjusted under 35 U.S.C. 154(b) by 772 days.

(21) Appl. No.: 11/721,497

(22) PCT Filed: Dec. 14, 2005

(86) PCT No.: PCT/JP2005/022953
§ 371 (c)(1),
(2), (4) Date: Jun. 21, 2007

(87) PCT Pub. No.: WO2006/064842
PCT Pub. Date: Jun. 22, 2006

(65) Prior Publication Data
US 2009/0290208 A1    Nov. 26, 2009

(30) Foreign Application Priority Data

Dec. 14, 2004   (JP) .................................. 2004-361155
Apr. 4, 2005    (JP) .................................. 2005-107180

(51) Int. Cl.
*G02B 26/00*   (2006.01)
*G09G 3/34*    (2006.01)

(52) U.S. Cl. ........ 359/296; 345/107; 345/108; 345/105; 430/31; 430/32; 430/34; 430/35; 430/38; 430/48; 204/471; 204/450

(58) Field of Classification Search .................. 359/296; 345/107, 108, 105; 430/31, 32, 34, 35, 38, 430/48; 204/471, 450
See application file for complete search history.

(56) References Cited

U.S. PATENT DOCUMENTS 6,577,433 B1 *   6/2003   Lin et al. ...................... 359/296

FOREIGN PATENT DOCUMENTS

| JP | 2004-29700 A | 1/2004 |
| JP | 2004-279545 A | 10/2004 |
| JP | 2005-62392 A | 3/2005 |
| WO | WO 2003/091799 A1 | 11/2003 |

* cited by examiner

*Primary Examiner* — Evelyn A. Lester
(74) *Attorney, Agent, or Firm* — Sughrue Mion, PLLC

(57) ABSTRACT

The present invention provides particles for display media constituting the display media used for an information display panel, in which the display media are sealed between two substrates, at least one of two substrates being transparent, and, in which the display media, to which an electrostatic field is applied, are made to move so as to display information, comprising: the particles having a substantially spherical shape, which are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and which have minute irregularities on their surface evenly. By such a construction, the particles for display media can obtain irregularities firmly fixed on their surface. Poor display can be solved by using the same.

29 Claims, 5 Drawing Sheets

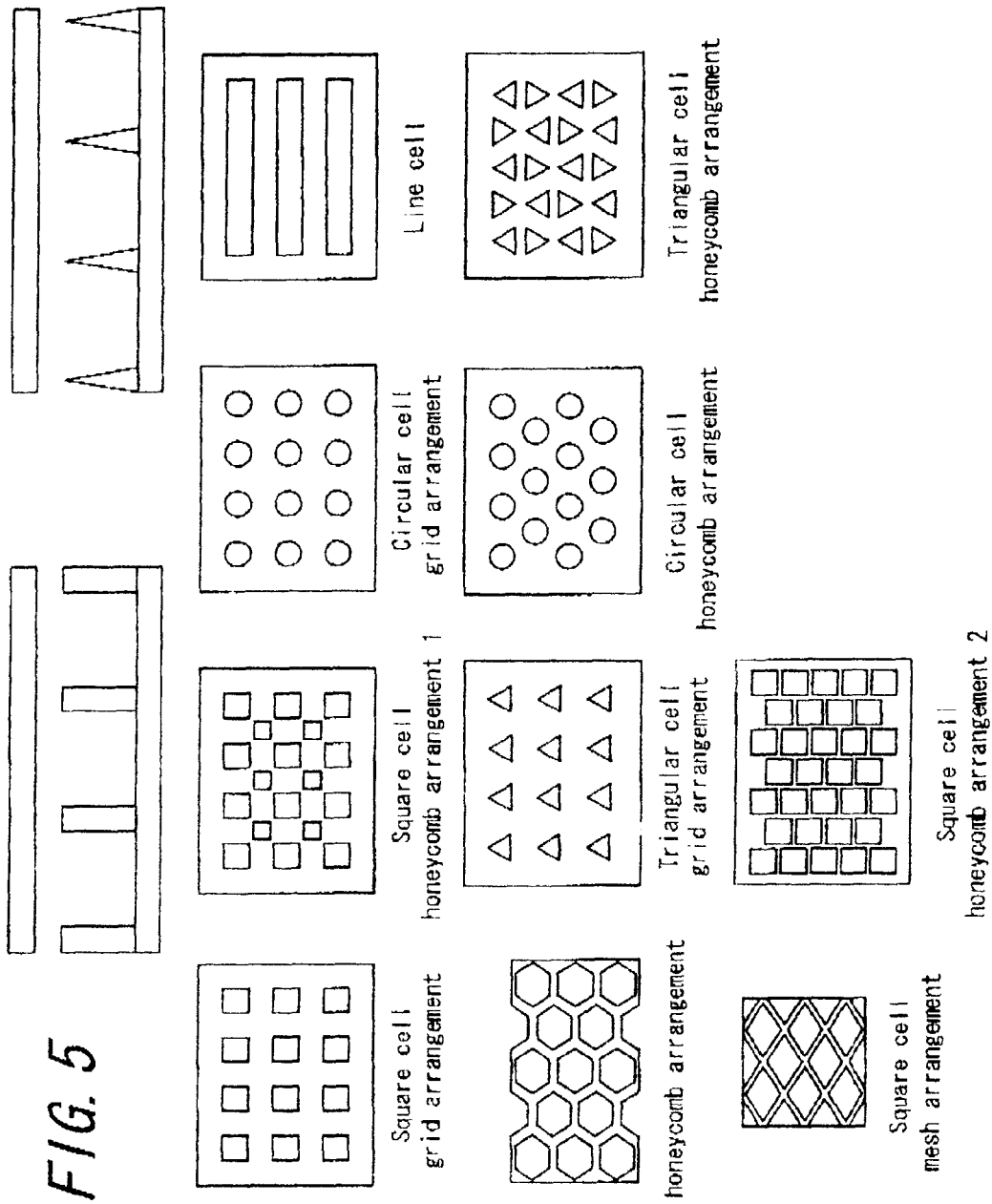

PARTICLE FOR DISPLAY MEDIUM AND INFORMATION DISPLAY PANEL UTILIZING THE SAME

TECHNICAL FIELD

The present invention relates to particles for display media constituting the display media used for an information display panel, in which the display media are sealed between two substrates, at least one of two substrates being transparent, and, in which the display media, to which an electrostatic field is applied, are made to move so as to display information. The present invention also relates to an information display panel utilizing the same.

RELATED ART

Heretofore, information display devices utilizing techniques such as electrophoresis, electro-chromic, thermal, and dichroic-particles-rotary methods have been proposed as substitutes for a liquid crystal display (LCD).

These conventional techniques have been deemed to be those available in inexpensive next-generation information display devices by virtue of their advantages, compared with LCD, such as a wide viewing angle close to normal printed matter, reduced consumption, and memory function, and have been expected to expand their reaches in displays for portable devices, an electronic paper, and the like. Particularly, a promising electrophoresis method has been proposed recently in which a dispersion liquid comprising dispersion particles and a coloration solution is microcapsulated and placed between opposed substrates.

However, the electrophoresis method presents the problem of a slowed response rate attributed to the viscosity resistance of a liquid in which particles migrate. Furthermore, the particles with a high specific gravity, such as titanium oxide particles, are dispersed in a solution with a low specific gravity and therefore easily precipitated. Thus, this method has difficulty in keeping the stability of dispersion state and therefore has the problem of lack of imaging repetition stability. Moreover, even the microcapsulation, which decreases a cell size to a microcapsule level, merely prevents the drawbacks from easily appearing and does not overcome any essential problem.

On the other hand, unlike the electrophoresis method utilizing behavior in the solution, a solution-free method has been proposed recently in which electro-conductive particles and a charge transport layer are incorporated into a portion of a substrate (see e.g., Non-Patent Document 1). However, the structure becomes complicated due to the placement of the charge transport layer, and further, a charge generation layer. Moreover, constant charge injection into the electro-conductive particles is difficult. Thus, this method presents the problem of lack of the stability of display rewriting or maintenance.

One known method to solve these various problems is an information display panel, in which the display media having optical reflectance and charge characteristics are sealed between two substrates, at least one of two substrates being transparent, and, in which the display media, to which an electrostatic field is applied, are made to move so as to display information.

Non-Patent Document 1: Gugrae-Jo, and 3 others, "New Toner Display Device (I)", "Japan Hardcopy '99", The 83rd Annual Conference Of The Imaging Society Of Japan, Jul. 21, 1999, p. 249-252

Acrylic, methacrylic, or styrene resin, which has a particle diameter on the order of 0.5 to 50 μm, is employed as materials for particles for display media constituting the display media used for the information display panel described above, because it is easy to determine positively or negatively chargeable properties and to secure a charge amount. An effective production method thereof uses a suspension polymerization rather than a crushing method, in order to secure simplified steps and reduced energy consumption or to directly obtain the desired particle diameter.

The suspension polymerization is a method in which particle raw materials including monomers, coloring agents, and so on are mechanically suspended in a suspended solvent such as water including not more than 10 wt % of suspension fixing agents such as surface activators, and then polymerized using heating, UV, electron beams, or the like. The particle raw materials in suspension state are hardened into solids by the control of polymerization to thereby obtain particles. In the polymerization, a polymerization initiator is generally utilized for efficient polymerization. The particles produced by the suspension polymerization are generally spherical particles with smooth surface. However, the particles with smooth surface, when utilized in the information display panel described above, caused the problem of a higher electrostatic field (or applied voltage) required for moving (driving) the particles. This is because the smooth surface increases a particle-particle or particle-substrate physical attaching force and thereby increases energy required for separating the particles therefrom and moving them in the space between the substrates.

The most convenient method to solve this problem is a method in which particle surface, to which metal oxide particles (external additives for toner) or the like are attached, is allowed to have irregularities so as to reduce the attaching force. This method, when utilized in the particles for display media used in the information display panel, caused the problem of poor display attributed to influences such as particle-particle or particle-substrate transfer of the external additives or to the sticking of the external additives to the particle or substrate surface. An alternative method has also been developed in which porous particles are produced by adding a unreactive solvent or the like to particle raw materials before the initiation of suspension polymerization, conducting polymerization, and then removing the solvent by heating, extraction, or the like, and then allowed to have irregularities on their surface. However, this method required steps and equipment for removing the solvent and was therefore inefficient.

DISCLOSURE OF THE INVENTION

An object of the present invention is to solve the problems described above and to provide particles for display media, which can obtain irregularities firmly fixed on their surface, and an information display panel, which can solve poor display by utilizing the same.

Particles for display media of the present invention are particles for display media constituting the display media used for an information display panel, in which the display media having optical reflectance and charge characteristics are sealed between two substrates, at least one of two substrates being transparent, and, in which the display media, to which an electrostatic field is applied, are made to move so as to display information, comprising: the particles having a substantially spherical shape, which are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and which have minute irregularities on their surface evenly.

In preferred embodiments of the particles for display media of the present invention, the minute irregularities are constituted by concave and convex portions having a circle equivalent diameter of 0.01-0.5 µm; a resin constituting the particles is formed by polymerizing one or more monomers at least selected from acrylic monomer, methacrylic monomer and styrene monomer; an amount of the multifunctional monomer is not less than 15 mol % in the monomer; all of the monomers are the multifunctional monomer; and the multifunctional monomer is acrylic monomer or methacrylic monomer.

In preferred embodiments of the particles for display media of the present invention, the particles are formed according to a suspension polymerization by suspending the particle raw material in a suspended solvent including not more than 10 wt % of at least one or more of suspension fixing agents and polymerizing the suspended matter; the suspension fixing agents include polyoxyalkylene chain in the molecule; the suspension fixing agents include polyoxyalkylene chain and sulfonate in the molecule; the suspension fixing agents are a water soluble resin; the suspension fixing agents are powders made of inorganic particles having a particle diameter of 10-1000 nm; the particle raw material or the suspended solvent includes a polymerization initiator having ten hours half period temperature of 40-75° C.; the polymerization initiator is acryl peroxide; and the polymerization initiator is azo material having ten or more of carbon number in one molecule.

In further preferred embodiments of the particles for display media of the present invention, the (acrylic or methacrylic) resin-hydrocarbon resin copolymer is (acrylic or methacrylic) resin-hydrocarbon resin block copolymer; the hydrocarbon resin of the (acrylic or methacrylic) resin-hydrocarbon resin copolymer is polystyrene resin; the hydrocarbon resin of the (acrylic or methacrylic) resin-hydrocarbon resin copolymer is fluorocarbon resin; the particle raw materials include coloring agents, to which a surface treatment is performed, or, which are formed as a master batch; and one or more materials selected from inorganic pigment, organic pigment and organic dye are used as the coloring agents, to which the surface treatment is performed, or, which are formed as the master batch.

In further alternative preferred embodiments of the particles for display media of the present invention, the particle raw materials include a material having an object for charging the particles; the material having an object for charging the particles is at least one material selected from charge control agents having a poor solubility for monomer, charge control agents having a solubility for monomer and monomer capable of copolymerization having chargeable functional group in a molecule; a resin having Tg of not less than 60° C. or a resin in which Tg is not observed, is used as the resin constituting the particles; a particle diameter of the particles is 0.5-50 µm; a color of the particles is a white color; a color of the particles is a black color; remaining amount after sieving of the particles formed by polymerizing the particle raw materials is not more than 20%, and the even minute irregularities on the surface of the particle have BET specific surface area of 5-150 $m^2/g$; and in the case of deforming the particles by applying a pressure thereto, a force necessary for deforming the particles by 10% is not less than 1 mN.

Alternatively, an information display panel of the present invention is an information display panel, in which the display media having optical reflectance and charge characteristics are sealed between two substrates, at least one of two substrates being transparent, and, in which the display media, to which an electrostatic field is applied, are made to move so as to display information, wherein the particles for display media thus constructed are used.

Furthermore, a method of producing particles for display media of the present invention is a suspension polymerization method of producing particles for display media constituting the display media used for an information display panel, in which the display media are sealed between two substrates, at least one of two substrates being transparent, and, in which the display media, to which an electrostatic field is applied, are made to move so as to display information, comprising the steps of: preparing particle raw materials including monomers, which include (acrylic or methacrylic) resin-hydrocarbon resin copolymer, in which a part of or all of the monomers are a multifunctional monomer having a plurality of polymerization reactive groups in one molecule; suspending the prepared particle raw materials in a suspended solvent including at least one or more surface activators; and polymerizing the particle raw materials so as to obtain substantially spherical particles; in which: the particle raw materials are suspended in the suspended solvent to be an oil spot having a diameter larger than a predetermined oil spot diameter; a material having an effect of starting or promoting the polymerization by dissolving it, under such a condition that ten hours half period temperature is not more than 75° C., is added in the suspended solvent; a step of suspending the particle raw materials to a predetermined oil spot diameter and a step of dispersing the material are performed simultaneously; and a polymerization is performed so as to obtain particles for display media having minute irregularities on their surface evenly.

The particles for display media of the present invention are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and have minute irregularities on their surface evenly. Therefore, irregularities firmly fixed on the particle surface can be obtained. Moreover, an information display panel utilizing the particles for display media has no reduction in display contrast or response rate during repetitive display rewiring. Thus, an information display panel having excellent endurance can be obtained.

BRIEF DESCRIPTION OF THE DRAWINGS

FIG. 5 is a diagram showing one example of the shape of partition walls in the information display panel of the present invention.

BEST MODE FOR CARRYING OUT THE INVENTION

Figure 1:
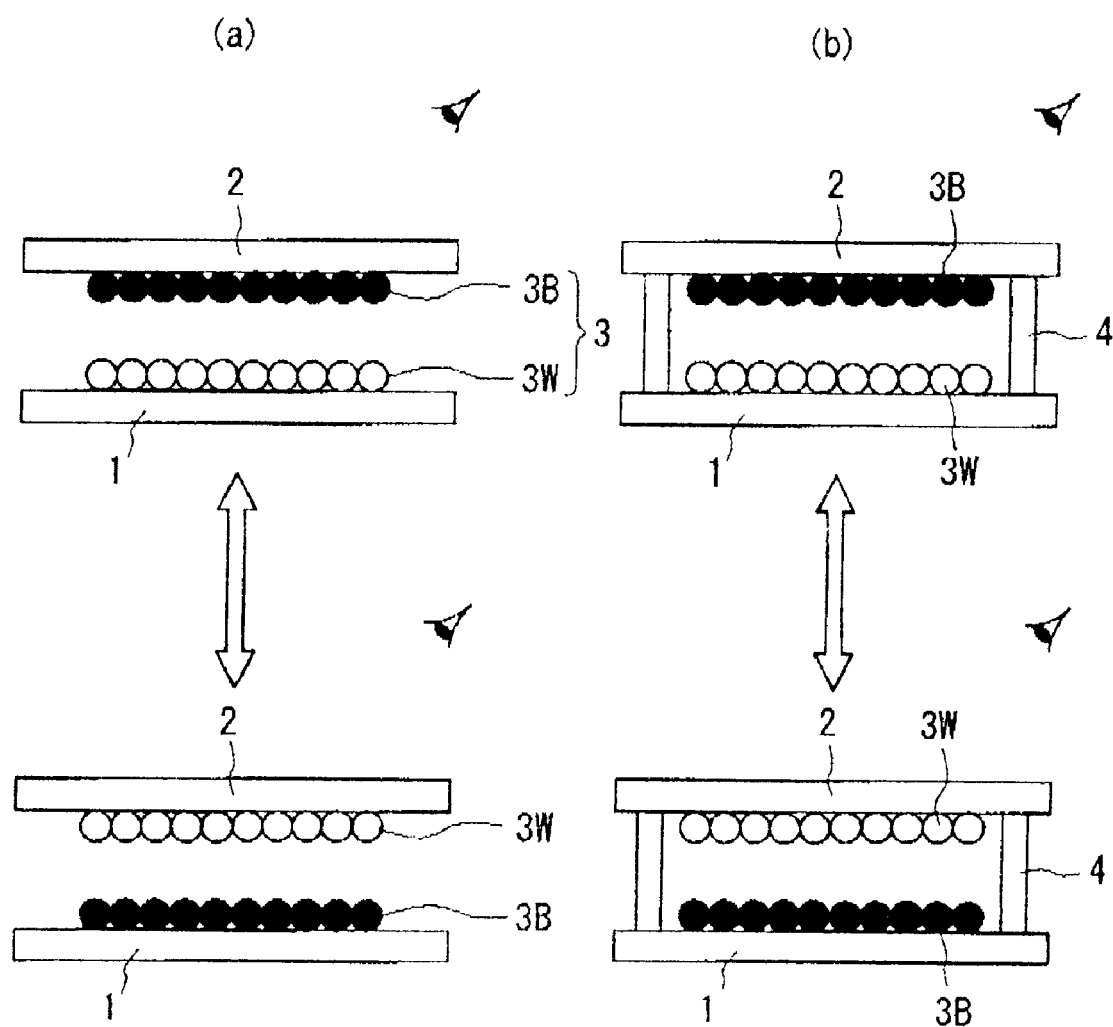
FIGS. 1(a) and 1(b) are respectively a diagram showing one embodiment of an information display panel of the present invention.
Figure 2:
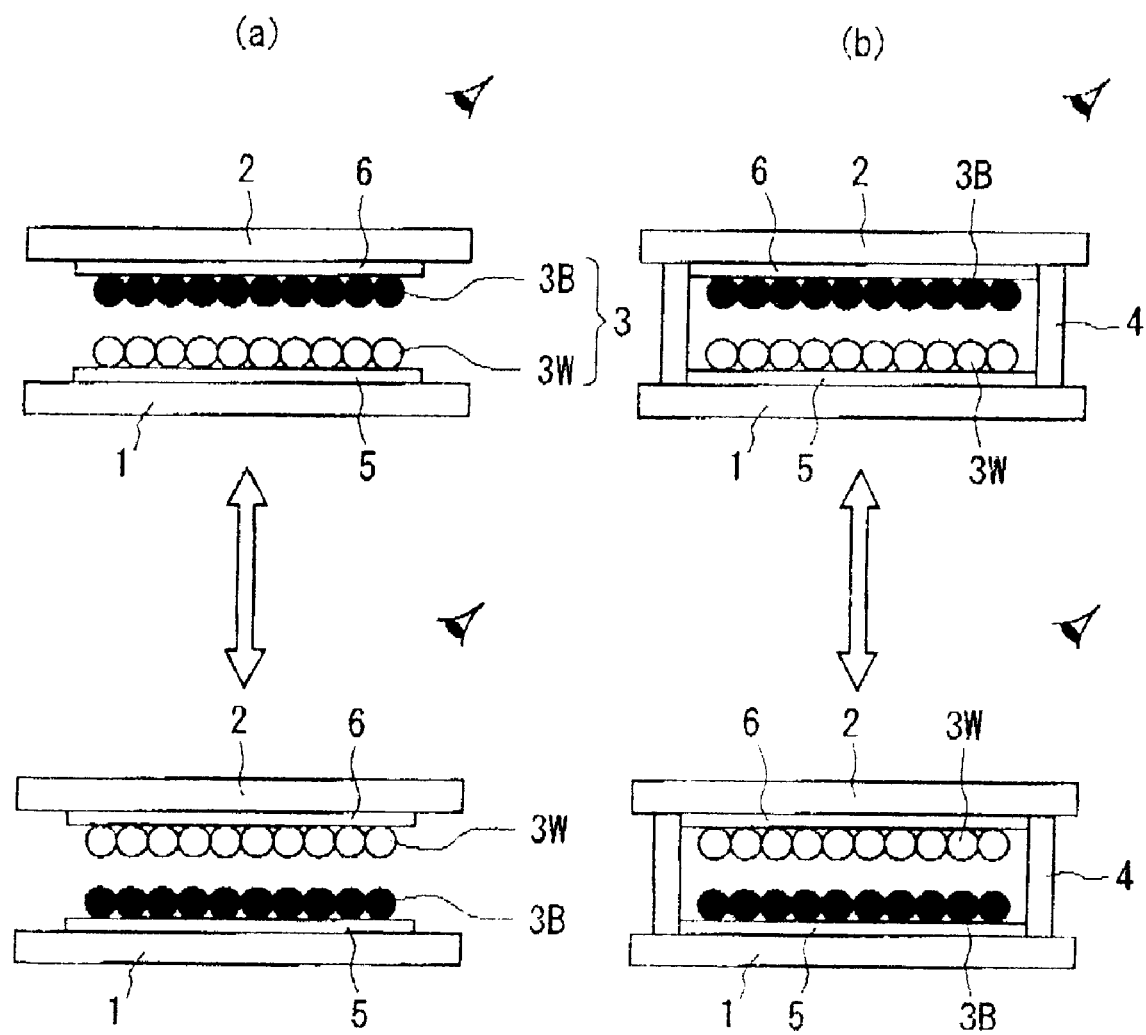
FIGS. 2(a) and 2(b) are respectively a diagram showing an alternative embodiment of the information display panel of the present invention.
Figure 3:
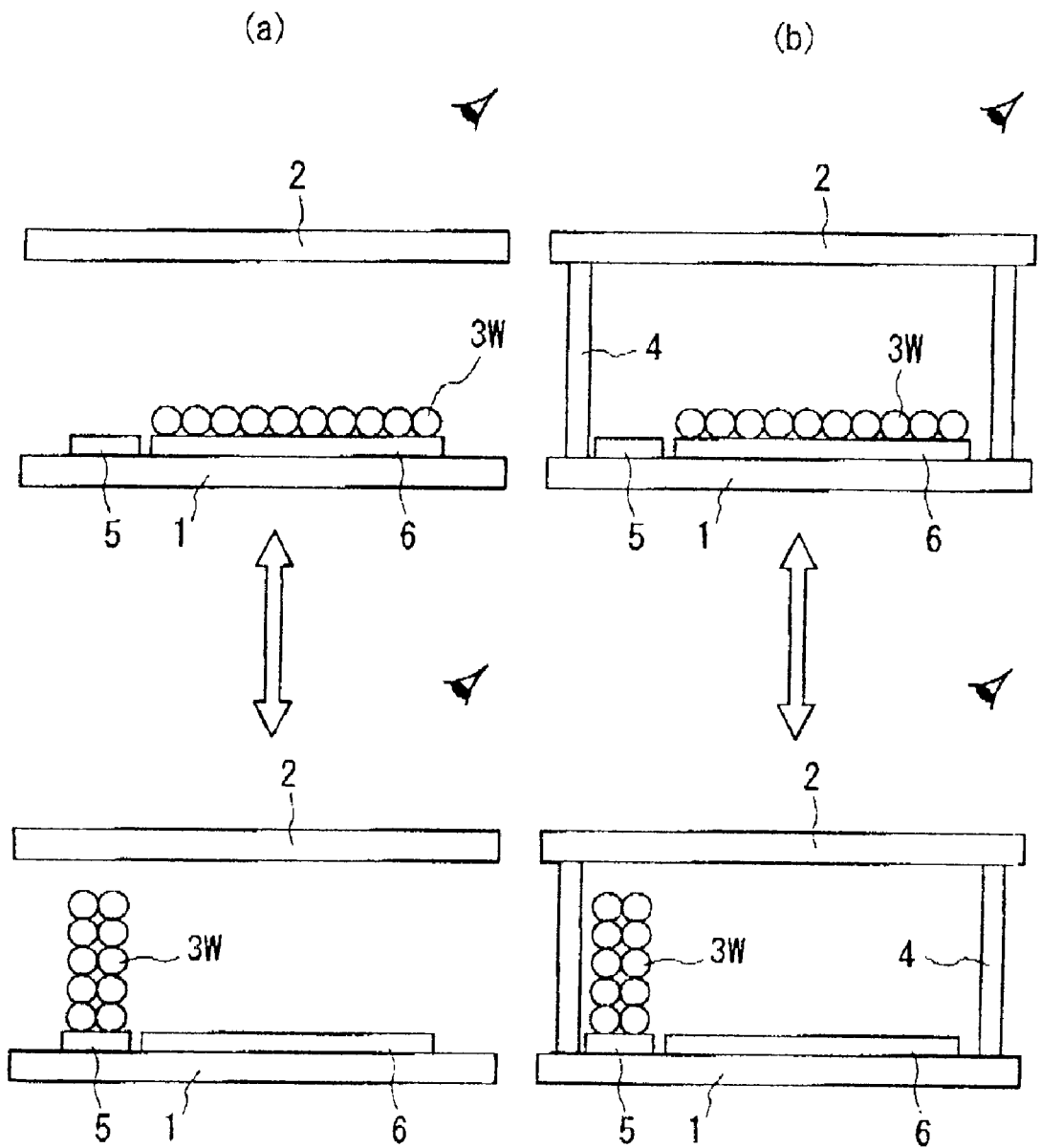
FIGS. 3(a) and 3(b) are respectively a diagram showing a further alternative embodiment of the information display panel of the present invention.

First, the basic construction of an information display panel will be described which utilizes, as display media, particles for display media (hereinafter, also referred to as particles) of the present invention. In the information display panel intended by the present invention, an electrostatic field is applied to the display media sealed between two opposed substrates. The charged display media are attracted along the direction of the applied electrostatic field by the force of the electrostatic field, Coulomb's force, or the like, and moved reciprocally by varying the direction of the electrostatic field through a switching operation of potential. As a result, information such as an image is displayed. Thus, the information display panel must be designed so that the display media can evenly move and maintain stability during display rewriting or during the continued display of information. In this context, possible forces applied to the particles constituting the display media are an attraction force between the particles attributed to Coulomb's force, an imaging force with respect to electrodes or substrates, an intermolecular force, a liquid bonding force, a gravity, and the like.

Embodiments of the information display panel intended by the present invention will be described with reference to FIGS. 1(a) and 1(b) to 3(a) and 3(b).

In the embodiments shown in FIGS. 1(a) and 1(b), at least two or more groups of display media 3 (here shown are white display media 3W comprising the group of white particles for display media and black display media 3B comprising the group of black particles for display media) each comprising at least one or more groups of particles and differing in optical reflectance and charge characteristics are moved in a direction perpendicular to substrates 1 and 2 in response to an electrostatic field applied outside of the substrates 1 and 2, so as to display a black color through the black display media 3B viewable to observers or display a white color through the white display media 3W viewable to observes. In the embodiment shown in FIG. 1(b), cells are formed with partition walls 4 provided, for example, in a grid form between the substrates 1 and 2, in addition to the embodiment shown in FIG. 1(a). In FIG. 1(b), the partition walls arranged at the near side are omitted.

In the embodiments shown in FIGS. 2(a) and 2(b), at least two or more groups of display media 3 (here shown are white display media 3W comprising the group of white particles for display media and black display media 3B comprising the group of black particles for display media) each comprising at least one or more groups of particles and differing in optical reflectance and charge characteristics are moved in a direction perpendicular to substrates 1 and 2 in response to an electrostatic field generated by the action of voltage applied between an electrode 5 provided on the substrate 1 and an electrode 6 provided on the substrate 2, so as to display a black color through the black display media 3B viewable to observers or display a white color through the white display media 3W viewable to observes. In the embodiment shown in FIG. 2(b), cells are formed with partition walls 4 provided, for example, in a grid form between the substrates 1 and 2, in addition to the embodiment shown in FIG. 2(a). In FIG. 2(b), the partition walls arranged at the near side are omitted.

In the embodiments shown in FIGS. 3(a) and 3(b), one group of display media 3 (here shown are white display media 3W comprising the group of white particles for display media) comprising at least one or more groups of particles and having optical reflectance and charge characteristics are moved in a direction parallel to substrates 1 and 2 in response to an electrostatic field generated by the action of voltage applied between electrodes 5 and 6 provided on the substrate 1, so as to display a white color through the white display media 3W viewable to observes or display the color of the electrode 6 or the substrate 1 through the electrode 6 or the substrate 1 viewable to observers. In the embodiment shown in FIG. 3(b), cells are formed with partition walls 4 provided, for example, in a grid form between the substrates 1 and 2, in addition to the embodiment shown in FIG. 3(a). In FIG. 3(b), the partition walls arranged at the near side are omitted.

According to the present invention, the feature of the particles for display media constituting the display media used for an information display panel, in which the display media having optical reflectance and charge characteristics are sealed between two substrates, at least one of two substrates being transparent, and, in which the display media, to which an electrostatic field is applied, are made to move so as to display information, is that the particles are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and have minute irregularities on their surface evenly.

By such a construction, irregularities fixed without falling off or the like are formed on the particle surface during suspension polymerization without steps of volatilizing or extracting solvents or the like. Accordingly, particles for display media that require a low voltage for drive (movement of the display media) and hardly cause poor display can be produced stably. The surface irregularities are preferably in the range of 0.01 to 0.5 μm in size in terms of a circle equivalent diameter of concave and convex portions. If the size of the surface irregularities is too small, a sufficient effect of reducing the attaching force is not produced. If the size is too large, the irregularities become ineffective because the surfaces of the concave and convex portions cause adhesion by themselves.

In this context, if an amount of the multifunctional monomer having a plurality of polymerization reactive groups in one molecule falls below 15 mol% in all of the monomers, the multifunctional monomer is less effective because irregularities do not appear on the particle surface or are small. Preferably, all of the monomers are the multifunctional monomer because particles excellent in heat resistance and in display endurance during repetitive display rewriting are obtained by virtue of the firm structure of a resin constituting the particles. More preferably, the multifunctional monomer having a plurality of polymerization reactive groups in one molecule is acrylic or methacrylic monomer because irregularities are easily produced on the particle surface.

Preferably, materials used as suspension fixing agents in suspension polymerization are nonionic surface activators including polyoxyethylene chain. The nonionic surface activators have relatively good suspension fixing properties while less remaining on the particle surface and less influencing the charge characteristics of the produced particles. Further preferably, surface activators including polyoxyethylene chain and sulfonate that have both nonionic and anionic surface activating effects are used as suspension fixing agents. These surface activators provide suspension fixing properties higher than those of the surface activators including only polyoxyethylene chain. In an alternative method, a water soluble resin such as PVA or cellulose resin can be used as suspension fixing agents. In this case, its suspension fixing properties are very high, although this suspension fixing agent has the disadvantage of remaining on the particle surface and influencing the charge characteristics of the particles.

In a further alternative method, powders made of inorganic particles of 10 to 1000 nm are used as suspension fixing agents. This method is a method in which inorganic oxide dissolved under acidic conditions is returned to neutral state and deposited as particles, which are then used as fixing agents and removed from the particle surface by redissolution under acidic conditions after the completion of polymerization. This method also shows very excellent suspension fixing properties. However, the method has the disadvantage of requiring, for example, a system for processing acidic waste liquids. A substance having a ten hours half period temperature of 40 to 75° C. is used as the optimum polymerization initiator. If this temperature is too low, polymerization proceeds even at room temperature, making it difficult to produce an excellent suspended solution. Alternatively, if polymerization increases the viscosity of the particle raw materials too much, substantially spherical particles cannot be obtained because the liquid drops do not have a spherical shape resulting from surface tension. On the other hand, if the temperature is too high, polymerization takes too much time and is therefore inefficient. If the polymerization initiator is dissolved in a suspended solution such as water, emulsion polymerization proceeds, producing uncolored particles in large amounts. Such contaminating particles, when used as the particles for display media, present the problem of reduction in display quality. In order to solve this problem, preferably, an oil soluble substance is used as a polymerization initiator. Among initiators, examples of such preferable substances include acyl peroxide. Alternatively, an azo initiator having ten or more of carbon number in one molecule may be utilized.

More preferably, the (acrylic or methacrylic) resin-hydrocarbon resin copolymer is an (acrylic or methacrylic) resin-hydrocarbon resin block copolymer. This is because the resins exhibit properties more easily by their respective block structures than random structures and efficiently make irregularities on the particle surface. When the hydrocarbon resin of the (acrylic or methacrylic) resin-hydrocarbon resin copolymer is polystyrene resin or fluorocarbon resin, its miscibility is easily differentiated from that of the acrylic or methacrylic resin and efficiently makes irregularities on the particle surface. Coloring agents must be rendered hydrophobic by surface treatment in order to prevent coloring efficiency from being deteriorated due to transfer to a suspended solvent during suspension. Alternatively, the resin coating of the coloring agents by forming a master batch produces similar effects. Any type of inorganic pigment, organic pigment, and organic dye can be used as the coloring agents, to which a surface treatment is performed, or, which are formed as a master batch. They may also be used in combination.

The particles for display media, when comprising charge control agents in order to obtain charge characteristics, can obtain distinct charge characteristics and easily obtain the desired performance. The desired charge characteristics include a charge amount, charge uniformity, and the prevention of reverse electrification. In one method, a substance having a poor solubility for monomer serving as a particle raw material is dispersed as charge control agents and thereby contained in the particles for display media. This method actively creates uneven charge distribution and is therefore effective for simultaneously producing trigger particles that easily fly by voltage in low charge state. In an alternative method, a charge control agent having a solubility for monomer is used. This method is advantageous in uniformly distributing the charge control agents and can move the particles at the same potential by virtue of their even charge characteristics, easily producing excellent display quality.

In one method, monomer capable of copolymerization having chargeable functional group in a molecule is formulated in the particle raw materials and used as a charge control agent chemically fixed in the resins through copolymerization during polymerization. This method can achieve the localization of a chargeable site such as the orientation of the chargeable functional group on the particle surface and is advantageous in producing effects even by use of small amounts of charge control agents. Moreover, the method hardly causes the bleedout or falling off of the charge control agents and is therefore effective for securing the endurance of charge characteristics.

The particles for display media must have heat resistance at not less than 60° C. in light of their usage environment in the information display panel. Considering physical heat resistance and heat resistance necessary for a sufficient charge amount, preferably, a resin having Tg of not less than 60° C. is used. When the particles are obtained by polymerizing the particle raw materials having an increased proportion of monomer having a plurality of functional groups capable of polymerization in a molecule, excellent heat resistance can be obtained. However, in this case, Tg is not observed.

Figure 4:
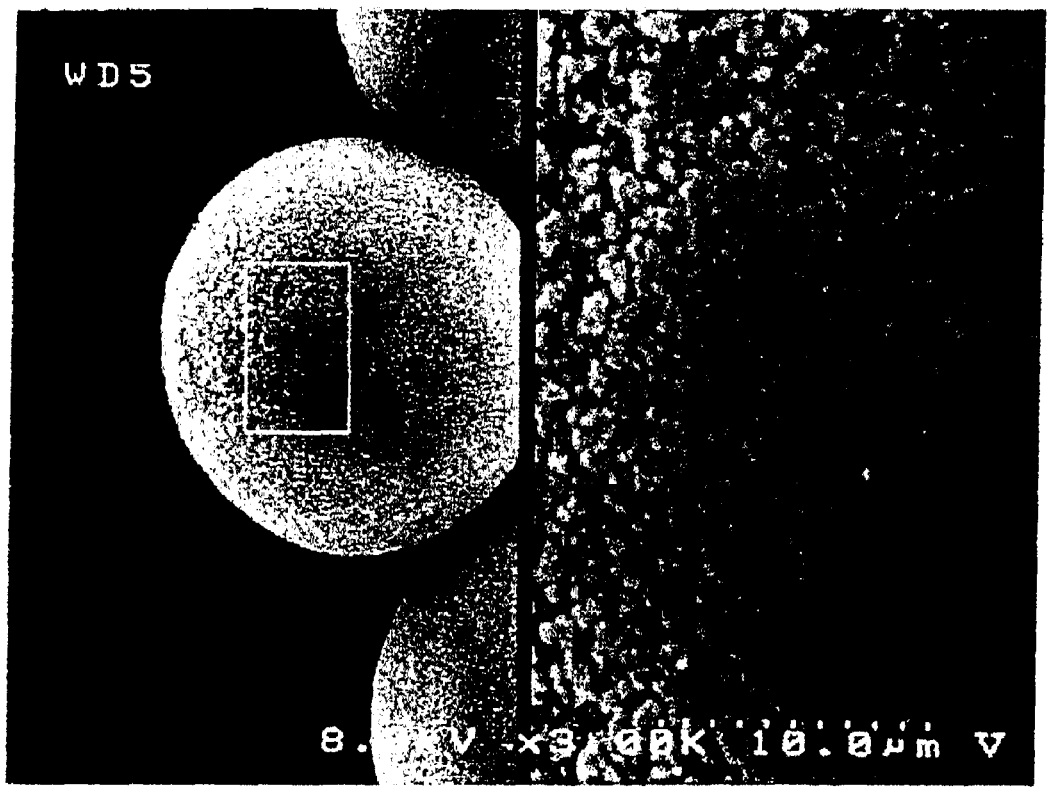
FIG. 4 is a diagram showing one example of a scanning electron microscope (SEM) image of particles for display media used in the information display panel of the present invention.

FIG. 4 shows one example of a scanning electron microscope (SEM) image of particles for display media used in the information display panel of the present invention. In the example of FIG. 4, the left and right images show the particle surface at 3000-fold and 15000-fold magnifications, respectively, and reveal that minute irregularities on order of several tenth of nm are formed on the particle surface.

Hereinafter, the basic construction of particles for display media (also simply referred to as particles) used in the information display panel of the present invention will be described.

Preferably, the particles have a substantially spherical shape. The particles are mainly composed of resins and can include, if necessary, charge control agents, coloring agents, inorganic additives, and so on, as in conventional techniques. Hereinafter, the resins, charge control agents, coloring agents, and other additives will be illustrated.

Examples of the resin include urethane resin, urea resin, acrylic resin, polyester resin, acryl urethane resin, acryl urethane silicone resin, acryl urethane fluorocarbon resin, acryl fluorocarbon resin, silicone resin, acryl silicone resin, epoxy resin, polystyrene resin, styrene acrylic resin, polyolefin resin, butyral resin, vinylidene chloride resin, melamine resin, phenolic resin, fluorocarbon resin, polycarbonate resin, polysulfone resin, polyether resin, and polyamide resin, which may be mixed in combination of two or more of them. Acryl urethane resin, acryl silicone resin, acryl fluorocarbon resin, acryl urethane silicone resin, acryl urethane fluorocarbon resin, fluorocarbon resin, and silicone resin are particularly preferable from the viewpoint of controlling the attaching force with substrates.

Examples of the charge control agents include, but not particularly limited to, negative charge control agents such as salicylic acid metal complexes, metal-containing azo dye, oil soluble, metal-containing dye (which contain a metal ion or a metal atom), the fourth grade ammonium salt compounds, calixarene compounds, boron-containing compounds (benzyl acid boron complexes), and nitroimidazole derivatives as well as positive charge control agents such as nigrosine dye, triphenylmethane compounds, the fourth grade ammonium salt compounds, polyamine resin, and imidazole derivatives. Other charge control agents that can be used include: metal oxide such as ultra-fine particles of silica, ultra-fine particles of titanium oxide, and ultra-fine particles of alumina; nitrogen-containing circular compounds such as pyridine and their derivatives or salts; and resins containing various organic pigments, fluorine, chlorine, nitrogen, or the like.

Organic or inorganic pigments or dyes of various kinds and colors illustrated below are available as coloring agents.

Examples of black coloring agents include carbon black, copper oxide, manganese dioxide, aniline black, and activate carbon.

Examples of blue coloring agents include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red coloring agents include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow coloring agents include chrome yellow, zinc chromate, cadmium yellow, yellow iron oxide, mineral first yellow, nickel titanium yellow, navel orange yellow, naphthol yellow S, hansayellow G, hansayellow 10G, benzidine yellow G, benzidine yellow GR, quinoline yellow lake, permanent yellow NCG, tartrazine lake, and C.I. pigment yellow 12.

Examples of green coloring agents include chrome green, chromium oxide, pigment green B, C.I. pigment green 7, Malachite green lake, and final yellow green G.

Examples of orange coloring agents include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31.

Examples of purple coloring agents include manganese purple, first violet B, and methyl violet lake.

Examples of white coloring agents include zinc white, titanium oxide, antimony white, and zinc sulfide.

Examples of extenders include baryta powder, barium carbonate, clay, silica, white carbon, talc, and alumina white. Alternatively, nigrosine, Methylene Blue, rose bengal, quinoline yellow, ultramarine blue, and the like may be used as various dyes such as basic, acidic, dispersion, and direct dyes.

Examples of the inorganic additives include titanium oxide, zinc white, zinc sulfide, antimony oxide, calcium carbonate, pearl white, talc, silica, calcium silicate, alumina white, cadmium yellow, cadmium red, cadmium orange, titanium yellow, Prussian blue, Armenian blue, cobalt blue, cobalt green, cobalt violet, ion oxide, carbon black, manganese ferrite black, cobalt ferrite black, copper powder, and aluminum powder.

These pigments and inorganic additives can be used alone or in combination. Of them, carbon black and titanium oxide are preferable as black and white pigments, respectively.

The particles used in the present invention are preferably in the range of 0.5 to 50 μm in particle diameter and are uniform in size. If the particle diameter is larger than this range, the resulting display lacks sharpness. If the particle diameter is smaller than this range, the movement of the particles as display media is hindered due to too large agglutination force between the particles.

Furthermore, in the present invention, particle diameter distribution Span of the particles represented by the following formula is set to less than 5, preferably less than 3:

$$\text{Span} = (d(0.9) - d(0.1))/d(0.5)$$

(wherein d(0.5) denotes a value of the particle diameter indicated in μm in which 50% of the particles have a particle diameter larger than this value and the remaining 50% have a particle diameter smaller than this value; d(0.1) denotes a value of the particle diameter indicated in μm in which the particles having a particle diameter smaller than this value account for 10% of the total; and d(0.9) denotes a value of the particle diameter indicated in μm in which the particles having a particle diameter smaller than this value account for 90% of the total).

When the value of Span falls within the range of not more than 5, the particles can be even in size and can be moved evenly as display media.

Furthermore, it is important for the correlation between the particles that a d(0.5) ratio of particles having smallest diameter to particles having largest diameter among the particles used is set to not more than 50, preferably not more than 10. Even if the particle diameter distribution Span is rendered small, it is preferred that the particles differing in charge characteristics from each other should have similar particle sizes for their movements in directions opposite to each other and should be capable of easy movement in equal amounts in directions opposite to each other. For this purpose, the ratio must fall within this range.

The particle-diameter-distribution and the average particle diameter can be determined according to a laser diffraction/scattering method or the like. The particles to be measured, when irradiated with a laser light, spatially bring about a light intensity distribution pattern of a diffraction/scattering light. This light intensity pattern corresponds to the particle-diameter. Thus, the average particle-diameter and the particle-diameter-distribution can be determined.

In this context, the average particle-diameter and the particle-diameter-distribution of the particles of the present invention can be obtained from a volume standard distribution. Specifically, the measurement of the particle-diameter and the particle-diameter-distribution can be carried out with a measuring apparatus Mastersizer 2000 (Malvern Instruments Ltd.), wherein the particles are added into a nitrogen gas flow and measured with analysis software (which is based on a volume standard distribution using Mie's theory) included in the apparatus.

It has been found that the charge amount of the particles for display media in the information display panel substantially depends on an initial charge amount, contact with partition walls, contact with substrates, and charge decay over time and is particularly determined by, as a main factor, a saturation value of the particles for the display media during a charge behavior, though depending on measurement conditions thereof, as a matter of course.

The present inventors have conducted diligent studies and have consequently found that the appropriate range of a charge characteristic value of the particles for display media can be evaluated by a blow-off method in which the same carrier particles are used to measure the charge amount of the particles used for display media.

When the display media constituted by the particles for display media is applied to a dry-type information display panel, the control of a gas in a gap surrounding the display media between the substrates is important and contributes to improvement in display stability. Specifically, it is important that the humidity of the gas in the gap is set to not more than 60% RH, preferably not more than 50% RH, in terms of relative humidity at 25° C.

This gap refers to a so-called gas portion in contact with the display media in FIGS. 1(a) and 1(b) to 3(a) and 3(b), that is, the space between the opposed substrates 1 and 2 except for the portions occupied by the electrodes 5 and 6 (if provided inside the substrates), the display media 3, the partition walls 4 (if provided), and the seal portion of the information display panel.

The type of the gas in the gap is not limited as long as it can obtain the humidity region described above. The gas is preferably dry air, dry nitrogen gas, dry argon gas, dry helium gas, dry carbon dioxide gas, dry methane gas, and the like. This gas must be sealed in the information display panel so as to maintain its humidity. It is thus important to, for example, fill the display media and assemble the information display panel in the predetermined humidity environment and important to further provide a seal member and seal method for preventing humidity from entering thereinto from the outside.

The gap between the substrates in the information display panel intended by the present invention is not limited as long as it can permit for the movement of the display media and can maintain the contrast. The gap is usually adjusted to 10 to 500 μm, preferably 10 to 200 μm.

For using the display media, its volume occupied rate in the space between the opposed substrates is preferably 5 to 70%, more preferably 5 to 60%. If the volume occupied rate exceeds 70%, the movement of the display media is hindered. If the volume occupied rate is less than 5%, the contrast is likely to be unclear.

Hereinafter, each member constituting the information display panel intended by the present invention will be described.

At least one of two substrates is the transparent substrate 2 through which the color of the display media 3 can be confirmed from the outside of the information display panel. A preferable material for this substrate has a high transmittance factor of visible lights and excellent heat resistance. The substrate 1 may be transparent or opaque. Examples of the substrate material include: polymer sheets such as polyethylene terephthalate, polyethylene naphthalate, polyether sulfone, polyethylene, polycarbonate, polyimide, and acryl; metal sheets having flexibility; and inorganic sheets such as glass and quartz having no flexibility. The substrate is preferably 2 to 5000 μm, more preferably 5 to 2000 μm, in thickness. If the substrate is too thin, strength and distance uniformity between the substrates are difficult to maintain. If the substrate is larger than 5000 μm in thickness, such a substrate is inconvenient for preparing a thin information display panel.

Examples of materials for forming the electrodes provided, if necessary, in the information display panel include: metals such as aluminum, silver, nickel, copper, and gold; conductive metal oxides such as ITO, indium oxide, conductive tin oxide, and conductive zinc oxide; and conductive polymers such as polyaniline, polypyrrole, and polythiophene. They are appropriately selected for use. Examples of a method of forming the electrode that can be used include: a method in which the materials illustrated above are prepared in a thin film form by, for example, a sputtering, vacuum vapor deposition, CVD (chemical vapor deposition), or coating method; and a method in which the mixed solution of an conductive agent with a solvent or a synthetic resin binder is applied. The electrode provided on the viewable substrate serving as a display surface must be transparent, whereas the electrode provided on the back substrate does not have to be transparent. In both cases, the conductive materials described above capable of pattern forming can be used preferably. The thickness of the electrode is not limited as long as it can maintain the electro-conductivity and does not hinder optical transparency. The electrode is preferably 3 to 1000 nm, more preferably 5 to 400 nm, in thickness. The electrode provided on the back substrate is similar in material and thickness to that provided on the viewable substrate and however, does not have to be transparent. In this case, the applied outer voltage may be superimposed with a direct current or an alternate current.

The optimum shape of the partition wall 4 provided, if necessary, on the substrate is appropriately set according to the type of the display media associated with display and cannot be generalized. The partition wall is adjusted to 2 to 100 μm, preferably 3 to 50 μm, in width, and 10 to 500 μm, preferably 10 to 200 μm, in height. Cells formed with these partition walls comprising ribs, as shown in FIG. 5, have, for example, a square, triangular, line, circular, or hexagonal shape in the planer direction of the substrate and arranged, for example, in a grid, honeycomb, or mesh form. The portion corresponding to the cross section of the partition wall viewable from the display surface (an area of the frame portion of the cell) should be made as small as possible, improving the sharpness of the image display.

EXAMPLES

Hereinafter, the present invention will be described specifically with reference to Examples as embodiments of the present invention and Comparative Examples. However, the present invention is not intended to be limited to them. Information display panels of Examples and Comparative Examples were produced by methods below and evaluated according to criteria below.

Example 1

To prepare positively charged particles, 3 parts by weight of nigrosine compound (Bontoron N07, manufactured by Orient Chemical Industries, Ltd.) as a positive charge control agent having a poor solubility for monomer was dispersed with a sand mill in 60 parts by weight of methyl methacrylate monomer (KANTO CHEMICAL's reagent) and 40 parts by weight (about 25 mol %) of ethylene glycol dimethacrylate (Wako Pure Chemical's reagent) as multifunctional monomer having a plurality of polymerization reactive groups in one molecule. 12.5 parts by weight of master batch comprising 40 parts by weight of carbon black (MA100; manufactured by Mitsubishi Chemical Corp.) as to black inorganic pigment (coloring agent) dispersed in advance in 60 parts by weight of methacrylic resin (Delpet 560F, manufactured by Asahi Kasei Corp.) as well as 5 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was dissolved therein. Then, 2 parts by weight of lauryl peroxide (PEROYL L, manufactured by NOF CORPORATION; ten hours half period temperature 61.6° C.) as acyl peroxide was further dissolved therein to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule. The product was filtered and dried. Then, a classifier (MDS-2: NIPPON PNEUMATIC MFG. CO., LTD.) was used to thereby obtain particles 1 ranging from 0.5 to 50 μm in particle diameter and having an average particle diameter of 9.8 p.m. Tg of the resin components of the particles 1 was 100° C. In SEM observation, the surface of the particles 1 was confirmed to have irregularities having a circle equivalent diameter of approximately 100 nm.

To prepare negatively charged particles, 5 parts by weight of phenolic condensate (Bontoron E89: produced by Orient Chemical Industries, Ltd.) as a negative charge control agent having a poor solubility for monomer was dispersed with a sand mill in 60 parts by weight of styrene monomer (KANTO CHEMICAL's reagent) and 40 parts by weight (about 35 mol %) of divinylbenzene (DVB-960, manufactured by Nippon Steel Chemical Co., Ltd.) as multifunctional monomer having a plurality of polymerization reactive groups in one molecule. 25 parts by weight of master batch comprising 80 parts by weight of titanium oxide (TIPAQUE CR-50, manufactured by ISHIHARA SANGYO KAISHA, LTD.) as white inorganic pigment (coloring agent) dispersed in advance in 20 parts by weight of methacrylic resin (Delpet 560F, manufactured by Asahi Kasei Corp.) as well as 5 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was dissolved therein. Then, 2 parts by weight of lauryl peroxide (PEROYL L, manufactured by NOF CORPORATION; ten hours half period temperature 61.6° C.) as acyl peroxide was further dissolved therein to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule. The product was filtered and dried. Then, a classifier (MDS-2: NIPPON PNEUMATIC MFG. CO., LTD.) was used to thereby obtain particles 2 ranging from 0.5 to 50 μm in particle diameter and having an average particle diameter of 9.5 μm. Tg of the resin components of the particles 2 was 95° C. In SEM observation, the surface of the particles 2 was confirmed to have irregularities having a circle equivalent diameter of approximately 150 nm.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 105 V.

Comparative Example 1

To prepare positively charged particles, particles 3 ranging from 0.5 to 50 μm in particle diameter and having an average particle diameter of 9.2 μm were obtained in totally the same way as in Example 1 except that (acrylic or methacrylic) resin-fluorocarbon resin block copolymer (MODIPER F600, manufactured by NOF CORPORATION) was not dissolved in the particles 1 described in Example 1. Tg of the resin components of the particles 3 was 102° C. In SEM observation, the surface of the particles 3 was confirmed to have no irregularities.

To prepare negatively charged particles, particles 4 ranging from 0.5 to 50 μm in particle diameter and having an average particle diameter of 8.9 μm were obtained in totally the same way as in Example 1 except that (acrylic or methacrylic) resin-fluorocarbon resin block copolymer (MODIPER F600, manufactured by NOF CORPORATION) was not dissolved in the particles 2 described in Example 1. Tg of the resin components of the particles 4 was 96° C. In SEM observation, the surface of the particles 4 was confirmed to have no irregularities.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state could be observed. However, the display was incomplete, and excellent display quality was not obtained. Reflectance was measured in each display state obtained at gradually varied applied voltages. A voltage at which the ratio between the reflectance during the display of a white color and the reflectance during the display of a black color became 8 folds was determined as a drive voltage. As a result, the voltage was 230 V.

Example 2

To prepare positively charged particles, particles 5 ranging from 0.5 to 50 μm in particle diameter and having an average particle diameter of 9.5 μm were obtained in totally the same way as in Example 1 except that 100 parts by weight of ethylene glycol dimethacrylate (Wako Pure Chemical's reagent) as multifunctional monomer having a plurality of polymerization reactive groups in one molecule was used without use of methyl methacrylate monomer in the particles 1 described in Example 1. Tg of the resin components of the particles was not observed. In SEM observation, the surface of the particles 5 was confirmed to have irregularities having a circle equivalent diameter of approximately 100 nm.

To prepare negatively charged particles, particles 6 ranging from 0.5 to 50 μm in particle diameter and having an average particle diameter of 10.0 μm were obtained in totally the same way as in Example 1 except that 100 parts by weight of divinylbenzene (DVB-960, manufactured by Nippon Steel Chemical Co., Ltd.) as multifunctional monomer having a plurality of polymerization reactive groups in one molecule was used without use of styrene monomer in the particles 2 described in Example 1. Tg of the resin components of the particles 6 was not observed. In SEM observation, the surface of the particles 6 was confirmed to have irregularities having a circle equivalent diameter of approximately 150 nm.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 105 V.

Comparative Example 2

To prepare positively charged particles, particles 7 ranging from 0.5 to 50 μm in particle diameter and having an average particle diameter of 9.8 μm were obtained in totally the same way as in Example 1 except that 100 parts by weight of methyl methacrylate monomer (KANTO CHEMICAL's reagent) was used without use of ethylene glycol dimethacrylate in the particles 1 described in Example 1. Tg of the resin components of the particles 7 was 100° C. In SEM observation, the surface of the particles 7 was confirmed to have no irregularities.

To prepare negatively charged particles, particles 8 ranging from 0.5 to 50 μm in particle diameter and having an average particle diameter of 9.3 μm were obtained in totally the same way as in Example 1 except that 100 parts by weight of styrene monomer (KANTO CHEMICAL's reagent) was used without use of divinylbenzene in the particles 2 described in Example 1. Tg of the resin components of the particles 8 was 85° C. In SEM observation, the surface of the particles 8 was confirmed to have no irregularities.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state could be observed. However, the display was incomplete, and excellent display quality was not obtained. Reflectance was measured in each display state obtained at gradually varied applied voltages. A voltage at which the ratio between the reflectance during the display of a white color and the reflectance during the display of a black color became 8 folds was determined as a drive voltage. As a result, the voltage was 240 V.

Example 3

To prepare positively charged particles, particles 9 ranging from 0.5 to 50 μm in particle diameter and having an average particle diameter of 9.4 μm were obtained in totally the same way as in Example 1 except that polyoxyethylene alkyl ether (EMULGEN 1135S-70, manufactured by KAO CORPORATION) as a surface activator including polyoxyalkylene chain in the molecule was used instead of sodium polyoxyethylene alkyl ether sulfate (LATEMURU E-118B, manufactured by KAO CORPORATION) in the particles 1 described in Example 1. Tg of the resin components of the particles 9 was 100° C. In SEM observation, the surface of the particles 9 was confirmed to have irregularities having a circle equivalent diameter of approximately 150 nm.

To prepare negatively charged particles, particles 10 ranging from 0.5 to 50 μm in particle diameter and having an average particle diameter of 9.0 μm were obtained in totally the same way as in Example 1 except that polyoxyethylene alkyl ether (EMULGEN 1135S-70, manufactured by KAO CORPORATION) as a surface activator including polyoxyalkylene chain in the molecule was used instead of sodium polyoxyethylene alkyl ether sulfate (LATEMURU E-118B, manufactured by KAO CORPORATION) in the particles 2 described in Example 1. Tg of the resin components of the particles 10 was 95° C. In SEM observation, the surface of the particles 10 was confirmed to have irregularities having a circle equivalent diameter of approximately 200 nm.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 110 V.

Example 4

To prepare positively charged particles, particles 11 ranging from 0.5 to 50 μm in particle diameter and having an average particle diameter of 9.7 μm were obtained in totally the same way as in Example 1 except that polyvinyl alcohol (Poval PVA-420, manufactured by Kuraray Co., Ltd.) as a water soluble resin surface activator was used instead of sodium polyoxyethylene alkyl ether sulfate (LATEMURU E-118B, manufactured by KAO CORPORATION) in the particles 1 described in Example 1. Tg of the resin components of the particles 11 was 100° C. In SEM observation, the surface of the particles 11 was confirmed to have irregularities having a circle equivalent diameter of approximately 150 nm.

To prepare negatively charged particles, particles 12 ranging from 0.5 to 50 μm in particle diameter and having an average particle diameter of 9.3 μm were obtained in totally the same way as in Example 1 except that polyvinyl alcohol (Poval PVA-420, manufactured by Kuraray Co., Ltd.) as a water soluble resin surface activator was used instead of sodium polyoxyethylene alkyl ether sulfate (LATEMURU E-118B, manufactured by KAO CORPORATION) in the particles 2 described in Example 1. Tg of the resin components of the particles 12 was 95° C. In SEM observation, the surface of the particles 12 was confirmed to have irregularities having a circle equivalent diameter of approximately 200 nm.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 110 V.

Example 5

To prepare positively charged particles, particles 13 ranging from 0.5 to 50 μm in particle diameter and having an average particle diameter of 9.5 μm were obtained in totally the same way as in Example 1 except that calcium triphosphate (KANTO CHEMICAL's reagent) as an inorganic particle surface activator dispersed at 80 nm was used instead of sodium polyoxyethylene alkyl ether sulfate (LATEMURU E-118B, manufactured by KAO CORPORATION) in the particles 1 described in Example 1. Tg of the resin components of the particles 13 was 100° C. In SEM observation, the surface of the particles 13 was confirmed to have irregularities having a circle equivalent diameter of approximately 100 nm.

To prepare negatively charged particles, particles 14 ranging from 0.5 to 50 μm in particle diameter and having an average particle diameter of 9.1 μm were obtained in totally the same way as in Example 1 except that calcium triphosphate (KANTO CHEMICAL's reagent) as an inorganic particle surface activator dispersed at 80 nm was used instead of sodium polyoxyethylene alkyl ether sulfate (LATEMURU E-118B, manufactured by KAO CORPORATION) in the particles 2 described in Example 1. Tg of the resin components of the particles 14 was 95° C. In SEM observation, the surface of the particles 14 was confirmed to have irregularities having a circle equivalent diameter of approximately 150 nm.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 105 V.

Comparative Example 3

To prepare positively charged particles, particles 15 ranging from 0.5 to 50 μm in particle diameter and having an average particle diameter of 9.5 μm were obtained in totally the same way as in Example 1 except that isobutyl peroxide (PEROYL IB, manufactured by NOF CORPORATION; ten hours half period temperature 32.7° C.) was used instead of lauryl peroxide (PEROYL L, manufactured by NOF CORPORATION; ten hours half period temperature 61.6° C.) in the particles 1 described in Example 1. Tg of the resin components of the particles 15 was 100° C. In SEM observation, the surface of the particles 15 was confirmed to have irregularities having a circle equivalent diameter of approximately 100 nm. However, polymerization was initiated before suspension due to too high reaction rate of the polymerization initiator and increased the monomer viscosity. As a result, the particles 15 were confirmed to be indefinite in shape without having a substantially spherical shape.

To prepare negatively charged particles, particles 16 ranging from 0.5 to 50 μm in particle diameter and having an average particle diameter of 9.1 μm were obtained in totally the same way as in Example 1 except that isobutyl peroxide (PEROYL IB, manufactured by NOF CORPORATION; ten hours half period temperature 32.7° C.) was used instead of lauryl peroxide (PEROYL L, manufactured by NOF CORPORATION; ten hours half period temperature 61.6° C.) in the particles 2 described in Example 1. Tg of the resin components of the particles 16 was 95° C. In SEM observation, the surface of the particles 16 was confirmed to have irregularities having a circle equivalent diameter of approximately 150 nm. However, polymerization was initiated before suspension due to too high reaction rate of the polymerization initiator and increased the monomer viscosity. As a result, the particles 16 were confirmed to be indefinite in shape without having a substantially spherical shape.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 180 V.

Comparative Example 4

To prepare positively charged particles, the production of particles was attempted in totally the same way as in Example 1 except that t-butyl peroxyisobutylate (Perbutyl IB, manufactured by NOF CORPORATION; ten hours half period temperature 77.3° C.) was used instead of lauryl peroxide (PEROYL L, manufactured by NOF CORPORATION; ten hours half period temperature 61.6° C.) in the particles 1 described in Example 1. However, the monomer was not hardened due to too slow reactivity of the polymerization initiator and formed no particles.

To prepare negatively charged particles, the production of particles was attempted in totally the same way as in Example 1 except that t-butyl peroxyisoburylate (Perbutyl IB, manufactured by NOF CORPORATION; ten hours half period temperature 77.3° C.) was used instead of lauryl peroxide (PEROYL L, manufactured by NOF CORPORATION; ten hours half period temperature 61.6° C.) in the particles 2 described in Example 1. However, the monomer was not hardened due to too slow reactivity of the polymerization initiator and formed no particles.

Example 6

To prepare positively charged particles, particles 17 ranging from 0.5 to 50 μm in particle diameter and having an average particle diameter of 9.0 μm were obtained in totally the same way as in Example 1 except that azobisdimethylvaleronitrile (V-65, manufactured by Wako Pure Chemical Industries, Ltd.; 10 hours half period temperature 51° C.) as azo material having ten or more of carbon number in one molecule was used instead of lauryl peroxide (PEROYL L, manufactured by NOF CORPORATION; ten hours half period temperature 61.6° C.) in the particles 1 described in Example 1. Tg of the resin components of the particles 17 was 100° C. In SEM observation, the surface of the particles 17 was confirmed to have irregularities having a circle equivalent diameter of approximately 200 nm.

To prepare negatively charged particles, particles 18 ranging from 0.5 to 50 μm in particle diameter and having an average particle diameter of 9.6 μm were obtained in totally the same way as in Example 1 except that azobisdimethylvaleronitrile (V-65, manufactured by Wako Pure Chemical Industries, Ltd.; 10 hours half period temperature 51° C.) as azo material having ten or more of carbon number in one molecule was used instead of lauryl peroxide (PEROYL L, manufactured by NOF CORPORATION; ten hours half period temperature 61.6° C.) in the particles 2 described in Example 1. Tg of the resin components of the particles 18 was 95° C. In SEM observation, the surface of the particles 18 was confirmed to have irregularities having a circle equivalent diameter of approximately 200 nm.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 110 V.

Comparative Example 5

To prepare positively charged particles, particles 19 ranging from 0.5 to 50 μm in particle diameter and having an average particle diameter of 9.9 μm were obtained in totally the same way as in Example 1 except that azobisisobutyronitrile (V-60, manufactured by Wako Pure Chemical Industries, Ltd.; 10 hours half period temperature 65° C.) as azo material having ten or less of carbon number in one molecule was used instead of lauryl peroxide (PEROYL L, manufactured by NOF CORPORATION; ten hours half period temperature 61.6° C.) in the particles 1 described in Example 1. Tg of the resin components of the particles 19 was 100° C. In SEM observation, the surface of the particles 19 was confirmed to have irregularities having a circle equivalent diameter of approximately 200 nm. Fine particles as by-products from emulsion polymerization attributed to insufficient hydrophobicity of the polymerization initiator could not completely be separated by classification and were therefore observed therein.

To prepare negatively charged particles, particles 20 ranging from 0.5 to 50 μm in particle diameter and having an average particle diameter of 9.6 μm were obtained in totally the same way as in Example 1 except that azobisisobutyronitrile (V-60, manufactured by Wako Pure Chemical Industries, Ltd.; 10 hours half period temperature 65° C.) as azo material having ten or less of carbon number in one molecule was used instead of lauryl peroxide (PEROYL L, manufactured by NOF CORPORATION; ten hours half period temperature 61.6° C.) in the particles 2 described in Example 1. Tg of the resin components of the particles 20 was 95° C. In SEM observation, the surface of the particles 20 was confirmed to have irregularities having a circle equivalent diameter of approximately 200 nm. Fine particles as by-products from emulsion polymerization attributed to insufficient hydrophobicity of the polymerization initiator could not completely be separated by classification and were therefore observed therein.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. However, in both cases, the particles on the substrate were contaminated with the particles having the other color, and excellent display quality was not obtained. Moreover, reflectance was measured in each display state obtained at gradually varied applied voltages. However, a voltage at which the ratio between the reflectance during the display of a white color and the reflectance during the display of a black color became 8 folds was not found in a voltage range of not more than 500 V due to reduction in contrast attributed to the fine particles.

Example 7

To prepare positively charged particles, particles 21 ranging from 0.5 to 50 μm in particle diameter and having an average particle diameter of 9.8 μm were obtained in totally the same way as in Example 1 except that styrene acrylic resin (Stylac AS-767, manufactured by Asahi Kasei Corp.) as (acrylic or methacrylic) resin-hydrocarbon resin copolymer was used without use of (acrylic or methacrylic) resin-fluorocarbon resin block copolymer (MODIPER F600, manufactured by NOF CORPORATION) in the particles 1 described in Example 1. Tg of the resin components of the particles 21 was 100° C. In SEM observation, the surface of the particles 21 was confirmed to have irregularities having a circle equivalent diameter of approximately 150 nm.

To prepare negatively charged particles, particles 22 ranging from 0.5 to 50 μm in particle diameter and having an average particle diameter of 9.2 μm were obtained in totally the same way as in Example 1 except that styrene acrylic resin (Stylac AS-767, manufactured by Asahi Kasei Corp.) as (acrylic or methacrylic) resin-hydrocarbon resin copolymer was used without use of (acrylic or methacrylic) resin-fluorocarbon resin block copolymer (MODIPER F600, manufactured by NOF CORPORATION) in the particles 2 described in Example 1. Tg of the resin components of the particles 22 was 95° C. In SEM observation, the surface of the particles 22 was confirmed to have irregularities having a circle equivalent diameter of approximately 150 nm.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 110 V.

The present invention is not intended to be limited to Examples described above, and variations and modifications may be made therein. Hereinafter, examples of such variations will be described.

(1) Variation 1

The particles for display media of the present invention, comprising the particles having a substantially spherical shape, which are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule can be constructed so that remaining amount after sieving of the particles formed by polymerizing the particle raw materials is not more than 20%, and the even minute irregularities on the surface of the particle have BET specific surface area of 5-150 m$^2$/g.

By such a construction, irregularities firmly fixed on the particle surface can be obtained. Moreover, an information display panel utilizing, as display media, such particles for display media has no reduction in display contrast and display rewriting response rate during repetitive display rewriting. Thus, an information display panel can be obtained which not only is excellent in endurance of display properties or display rewiring properties but also can drive the display media by an electrostatic field at a low applied voltage.

In the present variation 1, a BET specific surface area is used as an index for measuring the degree of surface irregularities and must fall within the range of 5-150 m$^2$/g, more preferably 20-100 m$^2$/g. When this index falls within the predetermined range, particles having low attaching properties are obtained. If this index value is too small, a sufficient effect of reducing the attaching force is not obtained. If this index value is too large, the particle structure is rendered loose, leading to reduction in display quality attributed to the particles destroyed during repetitive display rewriting. However, even if the value falls within the predetermined range, the physical attaching force cannot be reduced in some cases. Examples thereof include a case in which materials having low Tg are used in the particle raw materials. In this case, particle-particle or particle-substrate attaching properties adversely affect the particles, resulting in reduction in flowability as display media. As a result, reduction in display quality and the conversion of drive potentials into high voltages are caused.

Examples of an index for measuring the degree of this flowability include remaining amount after sieving. This amount refers to the proportion of the particles remaining on a sieve of preferably 32 μm in mesh size after shaking at an amplitude of 1 mm for 120 seconds. This value must be not more than 20%, more preferably not more than 10%. When this index falls within the predetermined range, particles serving as display media excellent in flowability are obtained. However, even the remaining amount after sieving of particles having a smooth surface without irregularities falls within the predetermined range in some cases. Examples thereof include a case in which particles having a high hardness are used. Such particles cause the conversion of drive potentials into high voltages for the reasons described above. Accordingly, preferable particles for display media are constructed so that both the values of the BET specific surface area and the remaining amount after sieving fall within the predetermined ranges.

Hereinafter, the variation 1 will be described more specifically with reference to Examples as embodiments of the present invention and Comparative Examples.

Example 11

To prepare positively charged particles, 3 parts by weight of nigrosine compound (Bontoron N07, manufactured by Orient Chemical Industries, Ltd.) as a positive charge control agent as well as 5 parts by weight of carbon black (Special Black, manufactured by Degussa) as black pigment was dispersed with a sand mill in 60 parts by weight of methyl methacrylate monomer (KANTO CHEMICAL's reagent) and 40 parts by weight (about 25 mol %) of ethylene glycol dimethacrylate (Wako Pure Chemical's reagent) as multifunctional monomer having a plurality of polymerization reactive groups in one molecule. 5 parts by weight of (acrylic or methacrylic) resin-hydrocarbon resin block copolymer (MODIPER F600, manufactured by NOF CORPORATION) was dissolved therein. Then, 2 parts by weight of lauryl peroxide (PEROYL L, manufactured by NOF CORPORATION) was further dissolved therein to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator. The product was filtered and dried. Then, a classifier (MDS-2: NIPPON PNEUMATIC MFG. CO., LTD.) was used to thereby obtain particles 1 ranging from 5 to 20 μm in particle diameter. A remaining amount after sieving of the particles 1 was 9%, and a BET specific surface area thereof was 80 m$^2$/g. Tg of the resin components of the particles 1 was 100° C. In SEM observation, the surface of the particles 1 was confirmed to have irregularities having a circle equivalent diameter of approximately 100 nm.

To prepare negatively charged particles, 5 parts by weight of phenolic condensate (Bontoron E89: produced by Orient Chemical industries, Ltd.) as a negative charge control agent as well as 20 parts by weight of titanium oxide (TIPAQUE CR-50, manufactured by ISHIHARA SANGYO KAISHA, LTD.) as white pigment was dispersed with a sand mill in 60 parts by weight of styrene monomer (KANTO CHEMICAL's reagent) and 40 parts by weight (about 35 mol %) of divinylbenzene (DVB-960, manufactured by Nippon Steel Chemical Co., Ltd.). 5 parts by weight of (acrylic or methacrylic) resin-hydrocarbon resin block copolymer (MODIPER F600, manufactured by NOF CORPORATION) was dissolved therein. Then, 2 parts by weight of lauryl peroxide (PEROYL L, manufactured by NOF CORPORATION) was further dissolved therein to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator. The product was filtered and dried. Then, a classifier (MDS-2: NIPPON PNEUMATIC MFG. CO., LTD.) was used to thereby obtain particles 2 ranging from 5 to 20 μm in particle diameter. A remaining amount after sieving of the particles 2 was 11%, and a BET specific surface area thereof was 62 m$^2$/g. Tg of the resin components of the particles 2 was 95° C. In SEM observation, the surface of the particles 2 was confirmed to have irregularities having a circle equivalent diameter of approximately 150 nm.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 105 V. Moreover, the drive voltage was not changed (105 V) even after display rewriting 0.3 million times in a repetitive rewriting endurance test conducted by inverting the direction of particle movement in each time.

Comparative Example 11

To prepare positively charged particles, particles 3 were obtained in totally the same way as in Example 11 except that (acrylic or methacrylic) resin-hydrocarbon resin block copolymer (MODIPER F600, manufactured by NOF CORPORATION) was not dissolved in the particles 1 described in Example 11. A remaining amount after sieving of the particles 3 was 15%, and a BET specific surface area thereof was 1.3 m$^2$/g. Tg of the resin components of the particles 3 was 100° C. In SEM observation, the surface of the particles 3 was confirmed to have no irregularities.

To prepare negatively charged particles, particles 4 were obtained in totally the same way as in Example 11 except that (acrylic or methacrylic) resin-hydrocarbon resin block copolymer (MODIPER F600, manufactured by NOF CORPORATION) was not dissolved in the particles 2 described in Example 11. A remaining amount after sieving of the particles 4 was 10%, and a BET specific surface area thereof was 0.8 m$^2$/g. Tg of the resin components of the particles 4 was 96° C. In SEM observation, the surface of the particles 4 was confirmed to have no irregularities.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state could be observed. However, the display was incomplete, and excellent display quality was not obtained. Reflectance was measured in each display state obtained at gradually varied applied voltages. Reflectance was measured in each display state obtained at gradually varied applied voltages. A voltage at which the ratio between the reflectance during the display of a white color and the reflectance during the display of a black color became 8 folds was determined as a drive voltage. As a result, the voltage was 280 V. Moreover, the drive voltage was 285 V after display rewriting 0.3 million times in a repetitive rewriting endurance test conducted by inverting the direction of particle movement in each time.

Comparative Example 12

To prepare positively charged particles, particles 5 were obtained in totally the same way as in Example 11 except that ethylhexyl methacrylate (KANTO CHEMICAL's reagent) was used instead of methyl methacrylate (KANTO CHEMICAL's reagent) in the particles 1 described in Example 11. A remaining amount after sieving of the particles 5 was 50%, and a BET specific surface area thereof was 58 m$^2$/g. Tg of the resin components of the particles 5 was 35° C. The particles 2 described in Example 11 were used as negatively charged particles.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state could be observed. However, the display was incomplete, and excellent display quality was not obtained. Reflectance was measured in each display state obtained at gradually varied applied voltages. Reflectance was measured in each display state obtained at gradually varied applied voltages. A voltage at which the ratio between the reflectance during the display of a white color and the reflectance during the display of a black color became 8 folds was determined as a drive voltage. As a result, the voltage was 200 V. Moreover, the drive voltage was 240 V after display rewriting 0.3 million times in a repetitive rewriting endurance test conducted by inverting the direction of particle movement in each time.

Comparative Example 13

To prepare positively charged particles, particles 6 were obtained in totally the same way as in Example 11 except that (acrylic or methacrylic) resin-hydrocarbon resin block copolymer (MODIPER F600, manufactured by NOF CORPORATION) was dissolved at an amount of 10 parts by weight changed from 5 parts by weight in the particles 1 described in Example 11. A remaining amount after sieving of the particles 6 was 9%, and a BET specific surface area thereof was 180 m$^2$/g. Tg of the resin components of the particles 6 was 100° C. In SEM observation, the surface of the particles 6 was confirmed to have irregularities having a circle equivalent diameter of approximately 80 nm. The particles 2 described in Example 1 were used as negatively charged particles.

To charge the particles, both groups of particles were mixed and stirred in equal amounts for frictional electrification. The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state could be observed. However, the display was incomplete, and excellent display quality was not obtained. Reflectance was measured in each display state obtained at gradually varied applied voltages. Reflectance was measured in each display state obtained at gradually varied voltages. A voltage at which the ratio between the reflectance during the display of a white color and the reflectance during the display of a black color became 8 folds was determined as a drive voltage. As a result, the voltage was 105 V. Moreover, the drive voltage was 180 V after inversion 0.3 million times in an inversion endurance test conducted by inverting the display of black/white colors in each time. In SEM observation, the positively charged particles after the inversion endurance test were observed to be destroyed and lack their substantially spherical shapes.

(2) Variation 2

The particles for display media of the present invention, comprising the particles having a substantially spherical shape, which are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and which have minute irregularities on their surface evenly can be constructed so that when, inside a particle having a radius R, an area between the center and ¾ of the radius R is defined as a core portion of the particle and an area outside of the core portion is defined as a shell portion of the particle, a sparse density Dc of the core portion and a sparse density Ds of the shell portion establish the relationship of Dc>Ds (wherein Dc=Vcb/(Vcv+Vcb) when an absolute particle volume of the core portion obtained by subtracting a void volume Vcv of the core portion from the total volume Vc of the core portion is defined as Vcb; and Ds=Vsb/(Vsv+Vsb) when an absolute particle volume of the shell portion obtained by subtracting a void volume Vsv of the shell portion from the total volume Vs of the shell portion is defined as Vsb).

By such a construction, the void portion that does not contribute to incident lights and absorption can be controlled preferably, and particles having a few void inside thereof can be obtained. Therefore, an information display panel utilizing, as display media, the particles for display media of the present invention, has no reduction in display contrast or response rate during repetitive display rewriting. Thus, an information display panel can be obtained which not only is excellent in endurance of display properties or display rewiring properties but also can drive the display media by an electrostatic field at a low applied voltage.

Hereinafter, the variation 2 will be described more specifically with reference to Examples as embodiments of the present invention and Comparative Examples.

Example 21

To prepare positively charged particles, 3 parts by weight of nigrosine compound (Bontoron N07, manufactured by Orient Chemical Industries, Ltd.) as a positive charge control agent having a poor solubility for monomer was dispersed with a sand mill in 60 parts by weight of methyl methacrylate monomer (KANTO CHEMICAL's reagent) and 40 parts by weight (about 25 mol %) of ethylene glycol dimethacrylate (Wako Pure Chemical's reagent) as multifunctional monomer having a plurality of polymerization reactive groups in one molecule. 12.5 parts by weight of master batch comprising 40 parts by weight of carbon black (MA100; manufactured by Mitsubishi Chemical Corp.) as black inorganic pigment (coloring agent) dispersed in advance in 60 parts by weight of methacrylic resin (Delpet 560F, manufactured by Asahi Kasei Corp.) as well as 5 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was dissolved therein to thereby obtain a solution. This solution was suspended in purified water (40° C.) supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule, to thereby obtain a suspended solution having an average oil spot diameter of approximately 80 μm. A dispersion liquid comprising lauryl peroxide (PEROYL L, manufactured by NOF CORPORATION; ten hours half period temperature 61.6° C.) as acyl peroxide dispersed in advance in water was added at 2 parts by weight in terms of the peroxide to the suspended solution. Then, the resulting mixed solution was resuspended so as to give an average oil spot diameter of approximately 10 μm and polymerized by heating. The product was filtered and dried. Then, a classifier (MDS-2: NIPPON PNEUMATIC MFG. CO., LTD.) was used to thereby obtain particles 1 ranging from 0.5 to 50 μm in particle diameter and having an average particle diameter of 9.8 μm. Sparse densities of shell and core portions obtained from the image analysis of a TEM image of a meridian cross section of the particles 1 were Ds=0.65 and Dc=0.85, respectively.

To prepare negatively charged particles, 100 parts by weight of PBT resin (TORAYCON 1401×31, manufactured by Toray Industries, Inc.) and 100 parts by weight of titanium oxide (TIPAQUE CR-50, manufactured by ISHIHARA SANGYO KAISHA, LTD.) were subjected to biaxial kneading and crushed into pieces with a jet mill (Labo Jet Mill IDS-LJ model, manufactured by Nippon Pneumatic Mfg. Co., Ltd.). These pieces were classified to thereby obtain particles 2 ranging 0.5 to 50 μm in particle diameter and having an average particle diameter of 9.1 μm.

The particles 1 and 2 were mixed and stirred in equal amounts for frictional electrification and filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 10 folds was defined as a drive voltage. As a result, the voltage was 120 V.

Comparative Example 21

Particles 3 were produced under the same conditions as in the particles 1 described in Example 21 except that (acrylic or methacrylic) resin-fluorocarbon resin block copolymer (MODIPER F600, manufactured by NOF CORPORATION)

was formulated in an amount changed to 0.4 parts by weight. The particles 3 ranged from 0.5 to 50 µm in particle diameter and had an average particle diameter of 10.1 µm. Sparse densities of shell and core portions obtained from the image analysis of a TEM image of a meridian cross section of the particles 3 were Ds=0.94 and Dc=0.99, respectively.

The particles 3 and the particles 2 described in Example 21 were mixed and stirred in equal amounts for frictional electrification and filled at a volume occupied rate of 30% into a cell made of substrates arranged via 100 µm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 10 folds was defined as a drive voltage. As a result, the voltage was 160 V, which was higher than the drive voltage required in Example 1.

Comparative Example 22

Particles 4 were produced under the same conditions as in the particles 1 described in Example 21 except that 80 parts by weight of acetic acid-3-methylbutyl (special grade reagent, manufactured by Wako Pure Chemical Industries, Ltd.) was used instead of 5 parts by weight of (acrylic or methacrylic) resin-fluorocarbon resin block copolymer (MODIPER F600, manufactured by NOF CORPORATION). The particles 4 ranged from 0.5 to 50 µm in particle diameter and had an average particle diameter of 9.7 µm. Sparse densities of shell and core portions obtained from the image analysis of a TEM image of a meridian cross section of the particles 4 were Ds=0.41 and Dc=0.57, respectively.

The particles 4 and the particles 2 described in Example 21 were mixed and stirred in equal amounts for frictional electrification and filled at a volume occupied rate of 30% into a cell made of substrates arranged via 100 µm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. Black color display state was observed through the glass substrate. Next, a voltage was applied thereto to give reverse potentials. As a result, both groups of particles flied in reverse directions, and white color display state was observed. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 10 folds was defined as a drive voltage. As a result, the voltage was 175 V, which was higher than the drive voltage required in Example 1.

(3) Variation 3

The particles for display media of the present invention, comprising the particles having a substantially spherical shape, which are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and which have minute irregularities on their surface evenly can be constructed so that the absolute value of a charge amount of the particles is set to not more than 50 µC/g. In this context, the reason for setting the absolute value of a charge amount of the particles for display media to not more than 50 µC/g is that if this value exceeds 50 µC/g, Coulomb's force causing attraction between the particles for display media or an imaging force with respect to electrodes or substrates is increased. Excellent display performed by attracting the display media by the force of an electrostatic field requires a force that overcomes these Coulomb's or imaging forces, and therefore requires a high electrostatic field, resulting in increases in drive voltage.

By such a construction, the attachment between the particles for display media is reduced, and reduction in drive voltage can be controlled optimally. Therefore, an information display panel utilizing, as display media, the particles for display media of the present invention has no reduction in display contrast or response rate during repetitive display rewriting. Thus, an information display panel can be obtained which not only is excellent in endurance of display properties or display rewiring properties but also can drive the display media by an electrostatic field at a low applied voltage.

(4) Variation 4

The particles for display media of the present invention, comprising the particles having a substantially spherical shape, which are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and which have minute irregularities on their surface evenly can be constructed so that in the case of deforming the particles by applying a pressure thereto, a force necessary for deforming the particles by 10% is not less than 1 mN.

By such a construction, the hardness of the particles can be controlled to be high. Therefore, an information display panel utilizing, as display media, the particles for display media of the present invention has no reduction in display contrast or response rate during repetitive display rewriting. Thus, an information display panel can be obtained which not only is excellent in endurance of display properties or display rewiring properties but also can drive the display media by an electrostatic field at a low applied voltage.

Preferably, the hardness is measured with a Fischer hardness tester (manufactured by Fischer Instruments). Hereinafter, a method of measuring a particle hardness by use of the Fischer hardness tester will be described.

<Method of Measuring Particle Hardness>

At first, several particles are dispersed onto a glass plate. This glass plate is loaded on a Fischer hardness tester HU200 (manufactured by Fischer Instruments). The position of the glass plate is adjusted to bring the particles directly under an indenter, while monitored with a CCD camera included in the tester. The indenter used is an indenter for Vickers hardness measurement whose tip has been polished into a square of 50 µm on a side. The intender is descended to the particles. A point at which the intender comes into contact with the particles is used as a starting point, from which loads are imposed at a constant rate (1.7 mN/sec) on the particles to deform them. The deformation of the particles under each load was observed. The hardness of the particles is represented by the size of the load under which the particle diameter is deformed by 10%.

Hereinafter, the variation 4 will be described more specifically with reference to Examples as embodiments of the present invention and Comparative Examples.

Example 31

Production of Black Particles

To prepare black particles for display media, 3 parts by weight of nigrosine compound (Bontoron N07, manufactured by Orient Chemical Industries, Ltd.) as a positive charge control agent as well as 5 parts by weight of carbon black (Special Black, manufactured by Degussa) as black pigment was dispersed with a sand mill in 60 parts by weight of methyl methacrylate monomer (KANTO CHEMICAL's reagent) and 40 parts by weight (about 25 mol %) of ethylene glycol dimethacrylate (Wako Pure Chemical's reagent) as multi-functional monomer having a plurality of polymerization reactive groups in one molecule, 5 parts by weight of (acrylic or methacrylic) resin-hydrocarbon resin block copolymer (MODIPER F600, manufactured by NOF CORPORATION) was dissolved therein. Then, 2 parts by weight of lauryl peroxide (PEROYL L, manufactured by NOF CORPORATION) was further dissolved therein to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator. The product was filtered and dried. Then, a classifier (MDS-2: NIPPON PNEUMATIC MFG. CO., LTD.) was used to thereby obtain particles B1. In SEM observation, the surface of the obtained particles B1 was confirmed to have irregularities having a circle equivalent diameter of approximately 0.1 µm. A hardness, that is, a load necessary for deformation by 10%, of the obtained particles B1 was determined by use of a Fischer hardness tester HU200 according to the method described above.

(Production of White Particles)

To prepare white particles for display media, 5 parts by weight of phenolic condensate (Bontoron E89: produced by Orient Chemical Industries, Ltd.) as a negative charge control agent as well as 20 parts by weight of titanium oxide (TIPAQUE CR-50, manufactured by ISHIHARA SANGYO KAISHA, LTD.) as white pigment was dispersed with a sand mill in 60 parts by weight of styrene monomer (KANTO CHEMICAL's reagent) and 40 parts by weight (about 35 mol %) of divinylbenzene (DVB-960, manufactured by Nippon Steel Chemical Co., Ltd.). 2 parts by weight of lauryl peroxide (PEROYL L, manufactured by NOF CORPORATION) was further dissolved therein to thereby obtain a solution. This solution was suspended and subjected to polymerization in purified water supplemented with 0.5 wt % of LATE-MURU E-118B (manufactured by KAO CORPORATION) as a surface activator. The product was filtered and dried. Then, a classifier (MDS-2: NIPPON PNEUMATIC MFG. CO., LTD.) was used to thereby obtain particles W. In SEM observation, the surface of the obtained particles W was observed to have no irregularities. A hardness, that is, a load necessary for deformation by 10%, of the obtained particles W was determined by use of a Fischer hardness tester HU200 according to the method described above.

The particles B1 and W were used as display media to produce an information display panel. Reflection densities during the display of a black color and the display of a white color at an applied voltage of +200 V were measured by use of a reflection image densitometer (RD-191, manufactured by GRETAG-MACBETH Inc.) to determine a contrast ratio=the reflection density during the display of a black color/the reflection density during the display of a white color. The values of an initial contrast ratio and a contrast ratio after display rewriting 10000 times are shown in Table 1 below. The contrast ratio was less changed even after display rewriting 10000 times, and the display media were driven favorably. Moreover, SEM photographs of the particles B1 and W after display rewriting 10000 times were separately taken to confirm their surface state. As a result, particular changes were not observed.

Comparative Example 31

Black particles B2 for display media were produced in the same way as in the particles B1 described in Example 31 except that ethylene glycol dimethacrylate was not used for producing the black particles for display media in Example 31. In SEM observation, the surface of the obtained particles B2 was observed to have irregularities having a circle equivalent diameter of approximately 0.1 µm. The properties of the particles B2 and changes in contrast ratio obtained by using the particles B2 and W as display media are shown in Table 1. The contrast ratio after display rewriting 10000 times was reduced, and the display media were hardly driven. Moreover, SEM photographs of the particles B2 after display rewriting 10000 times were taken to confirm their surface state. As a result, the irregularities were confirmed to disappear.

Comparative Example 32

Black particles B3 for display media were produced in the same way as in the particles B1 described in Example 31 except that (acrylic or methacrylic) resin-hydrocarbon resin block copolymer (MODIPER F600, manufactured by NOF CORPORATION) was not used for producing the black particles for display media in Example 31. In SEM observation, the surface of the obtained particles B3 was observed to have no irregularities. The properties of the particles B3 and changes in contrast ratio obtained by using the particles B3 and W as display media are shown in Table 1. Because the initial drive voltage was high, the display media were poorly driven at 200 V, causing reduction in contrast ratio. Moreover, the contrast ration remained low after display rewriting 10000 times.

TABLE 1

|  |  | Example 31 | Comparative Example 31 | Comparative Example 32 |
|---|---|---|---|---|
| Black, positively charged particles |  | B1 | B2 | B3 |
| Formulation | Resin | 60 | 100 | 60 |
|  | Crosslinking agent | 40 | 0 | 40 |
|  | Block copolymer | 5 | 5 | 0 |
|  | Coloring agent | 5 | 5 | 5 |
|  | Charge control agent | 3 | 3 | 3 |
|  | Surface activator | 2 | 2 | 2 |
| Properties | Average particle diameter (μm) | 9.3 | 9.2 | 9.1 |
|  | Average charge amount (μC/g) | 10.5 | 8.8 | 14.5 |
|  | Load (mN) necessary for deformation by 10% | 1.5 | 0.9 | 2.1 |
| White, negatively charged particles |  |  | W |  |
| Formulation | Resin |  | 60 |  |
|  | Crosslinking agent |  | 40 |  |
|  | Coloring agent |  | 20 |  |
|  | Charge control agent |  | 5 |  |
|  | Surface activator |  | 2 |  |
| Properties | Average particle diameter (μm) |  | 9.5 |  |
|  | Average charge amount (μC/g) |  | −15.8 |  |
|  | Load (mN) necessary for deformation by 10% |  | 2.4 |  |
| Display quality | Initial contrast ratio | 0.8 | 0.8 | 0.3 |
|  | Contrast ratio after display rewriting 10000 times | 0.8 | 0.4 | 0.3 |

(5) Variation 5

The particles for display media of the present invention, comprising the particles having a substantially spherical shape, which are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and which have minute irregularities on their surface evenly can be constructed so that an equilibrium moisture content W (%) is W≦3.0(%).

By such a construction, particles for display media can be obtained which can favorably maintain a frictional charge without charge leakage. Therefore, an information display panel utilizing, as display media, the particles for display media of the present invention has no reduction in display contrast or response rate during repetitive display rewriting. Thus, an information display panel can be obtained which not only is excellent in endurance of display properties or display rewiring properties but also can drive the display media by an electrostatic field at a low applied voltage.

As one example of a preferable method of measuring an equilibrium moisture content W, an amount Vw (cm³) of water volatilized by heating at 200° C. for 45 minutes from the particles for display media with a volume Vp (cm³) left standing for 1 week or longer in a 25° C./50% RH environment is measured with a Karl Fischer coulometric titrator CA-100 (manufactured by Mitsubishi Chemical Corp.) to determine an equilibrium moisture content W (%) of the particles for display media as W=Vw/(Vp−Vw).

(6) Variation 6

The particles for display media of the present invention, comprising the particles having a substantially spherical shape, which are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and which have minute irregularities on their surface evenly can be constructed so that a relative haze value H defined as H=Gs/Gd (wherein Gd denotes a gloss at an angle of 20±0.9° with respect to −20° incident light defined according to ISO2813; and Gs denotes a gloss at an angle of 18.2±0.9° and 21.8±0.9° with respect to −20° incident light defined according to ISO2813) of the particles is 0.2<H≦1.0.

The relative haze value H reflects a particle surface shape, that is, the amount and depth of irregularities on the particle surface. The relative haze value H thus constructed improves the contact attaching force between the particles or between the particles and substrates or electrodes and further achieves improvement in black and white chromaticities. Therefore, an information display panel utilizing, as display media, the particles for display media of the present invention has no reduction in display contrast or response rate during repetitive display rewriting. Thus, an information display panel can be obtained which not only is excellent in endurance of display properties or display rewiring properties but also can drive the display media by an electrostatic field at a low applied voltage.

The relative haze value H of the particles for display media is defined as H=Gs/Gd, wherein Gd denotes a gloss at an angle of 20±0.9° with respect to −20° incident light defined according to ISO2813; and Gs denotes a gloss at an angle of 18.2±0.90 and 21.8±0.9° with respect to −20° incident light defined according to ISO2813. In the present invention, the particles for display media were filled at a thickness of not less than 0.5 mm into an appropriate container with an upper open mouth. The surface was leveled off, and the Gd and Gs of the surface were measured by use of a haze-gloss reflectometer No. 4601 (manufactured by BYK-Gardner, Inc.) in a dark room.

(7) Variation 7

A suspension polymerization method of the present invention can be constructed to comprise the steps of: preparing particle raw materials for the particles for display media of the present invention, comprising the particles having a substantially spherical shape, which are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and which have minute irregularities on their surface evenly; suspending the prepared particle raw materials in a suspended solvent including at least one or more surface activators; and polymerizing the particle raw materials so as to thereby obtain substantially spherical particles; in which: the particle raw materials are suspended in the suspended solvent to be an oil spot having a diameter larger than a predetermined oil spot diameter; a material having an effect of starting or promoting the polymerization by dissolving it, under such a condition that ten hours half period temperature is not more than 75° C., is added in the suspended solvent; a step of suspending the particle raw materials to a predetermined oil spot diameter and a step of dispersing the material are performed simultaneously; and a polymerization is performed so as to thereby obtain particles for display media having minute irregularities on their surface evenly.

By such a construction, polymerization does not start until a temperature reaches the predetermined value. Therefore, particles having stable performance are obtained without variations in their performance depending on the degree of progression of polymerization, as in a case in which the particle raw materials including polymerization initiators are left standing. Thus, when this production method is used, irregularities fixed without falling off or the like are formed on the particle surface during suspension polymerization without steps of volatilizing or extracting solvents or the like. Therefore, particles for display media that require a low voltage for the drive of the display media and hardly cause poor display can be produced stably.

Hereinafter, the variation 7 will be described more specifically with reference to Examples as embodiments of the present invention and Comparative Examples.

Example 41

To prepare positively charged particles, 3 parts by weight of nigrosine compound (Bontoron N07, manufactured by Orient Chemical Industries, Ltd.) as a positive charge control agent having a poor solubility for monomer was dispersed with a sand mill in 60 parts by weight of methyl methacrylate monomer (KANTO CHEMICAL's reagent) and 40 parts by weight (about 25 mol %) of ethylene glycol dimethacrylate (Wako Pure Chemical's reagent) as multifunctional monomer having a plurality of polymerization reactive groups in one molecule. 12.5 parts by weight of master batch comprising 40 parts by weight of carbon black (MA100; manufactured by Mitsubishi Chemical Corp.) as black inorganic pigment (coloring agent) dispersed in advance in 60 parts by weight of methacrylic resin (Delpet 560F, manufactured by Asahi Kasei Corp.) as well as 5 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was dissolved therein to thereby obtain a solution. This solution was suspended in purified water (40° C.) supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule, to thereby obtain a suspended solution having an oil spot diameter of approximately 80 µm. A dispersion liquid comprising lauryl peroxide (PEROYL L, manufactured by NOF CORPORATION; ten hours half period temperature 61.6° C.) as acyl peroxide dispersed in advance in water was added at 2 parts by weight in terms of the peroxide to the suspended solution. Then, the resulting mixed solution was resuspended so as to give an oil spot diameter of approximately 10 µm and polymerized by heating. The product was filtered and dried. Then, a classifier (MDS-2: NIPPON PNEUMATIC MFG. CO., LTD.) was used to thereby obtain particles 1 ranging from 0.5 to 50 µm in particle diameter and having an average particle diameter of 9.8 µm. Tg of the resin components of the particles 1 was 100° C. In SEM observation, the surface of the particles 1 was confirmed to have irregularities having a circle equivalent diameter of approximately 100 nm.

To prepare negatively charged particles, 5 parts by weight of phenolic condensate (Bontoron E89: produced by Orient Chemical Industries, Ltd.) as a negative charge control agent having a poor solubility for monomer was dispersed with a sand mill in 60 parts by weight of styrene monomer (KANTO CHEMICAL's reagent) and 40 parts by weight (about 35 mol %) of divinylbenzene (DVB-960, manufactured by Nippon Steel Chemical Co., Ltd.) as multifunctional monomer having a plurality of polymerization reactive groups in one molecule. 25 parts by weight of master batch comprising 80 parts by weight of titanium oxide (TIPAQUE CR-50, manufactured by ISHIHARA SANGYO KAISHA, LTD.) as white inorganic pigment (coloring agent) dispersed in advance in 20 parts by weight of methacrylic resin (Delpet 560F, manufactured by Asahi Kasei Corp.) as well as 5 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was dissolved therein to thereby obtain a solution. This solution was suspended in purified water (40° C.) supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule, to thereby obtain a suspended solution having an oil spot diameter of approximately 80 nm. A dispersion liquid comprising lauryl peroxide (PEROYL L, manufactured by NOF CORPORATION; ten hours half period temperature 61.6° C.) as acyl peroxide dispersed in advance in water was added at 2 parts by weight in terms of the peroxide to the suspended solution. Then, the resulting mixed solution was resuspended so as to give an oil spot diameter of approximately 10 µm and polymerized by heating. The product was filtered and dried. Then, a classifier (MDS-2: NIPPON PNEUMATIC MFG. CO., LTD.) was used to thereby obtain particles 2 ranging from 0.5 to 50 µm in particle diameter and having an average particle diameter of 9.5 µm. Tg of the resin components of the particles 2 was 95° C. In SEM observation, the surface of the particles 2 was confirmed to have irregularities having a circle equivalent diameter of approximately 150 nm.

To charge the particles, both groups of particles were mixed and stirred in equal amounts for frictional electrification.

The mixed particles were filled at a volume occupied rate of 30% into a cell made of substrates arranged via 100 µm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. The information display panel observed through the glass substrate displayed a black color. Next, a voltage was applied thereto to give reverse potentials. As a result, both groups of particles flied in reverse directions, and the information display panel displayed a white color. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 115 V.

Comparative Example 41

To prepare positively charged particles, particles 3 ranging from 0.5 to 50 μm in particle diameter and having an average particle diameter of 9.2 μm were obtained in totally the same way as in the particles 1 described in Example 41 except that (acrylic or methacrylic) resin-fluorocarbon resin block copolymer (MODIPER F600, manufactured by NOF CORPORATION) was not dissolved in the particles 1. Tg of the resin components of the particles 3 was 102° C. In SEM observation, the surface of the particles 3 was confirmed to have no irregularities.

To prepare negatively charged particles, particles 4 ranging from 0.5 to 50 μm in particle diameter and having an average particle diameter of 8.9 μm were obtained in totally the same way as in the particles 2 described in Example 41 except that (acrylic or methacrylic) resin-fluorocarbon resin block copolymer (MODIPER F600, manufactured by NOF CORPORATION) was not dissolved in the particles 2. Tg of the resin components of the particles 4 was 96° C. In SEM observation, the surface of the particles 4 was confirmed to have no irregularities.

To charge the particles, both groups of particles were mixed and stirred in equal amounts for frictional electrification.

The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. The panel observed through the glass substrate displayed a black color. Next, a voltage was applied thereto to give reverse potentials. As a result, both groups of particles flied in reverse directions, and the panel displayed a white color. However, the display rewriting was incomplete, and excellent display quality was not obtained. Reflectance was measured in each display state obtained at gradually varied applied voltages. A voltage at which the ratio between the reflectance during the display of a white color and the reflectance during the display of a black color became 8 folds was determined as a drive voltage. As a result, the voltage was 280 V.

Comparative Example 42

To prepare positively charged particles, particles 5 ranging from 0.5 to 50 nm in particle diameter and having an average particle diameter of 9.5 μm were obtained in totally the same way as in Example 41 except that purified water supplemented with the surface activator as a suspended solvent in the particles 1 was used at 65° C. Tg of the resin components of the particles 5 was 100° C. In SEM observation, the surface of the particles 5 was confirmed to have irregularities having a circle equivalent diameter of approximately 100 nm. However, polymerization was initiated before suspension into the predetermined oil spot diameter due to too high reaction rate of the polymerization initiator and increased the monomer viscosity. As a result, the particles were confirmed to be indefinite in shape without having a substantially spherical shape.

To prepare negatively charged particles, particles 6 ranging from 0.5 to 50 μm in particle diameter and having an average particle diameter of 9.1 μm were obtained in totally the same way as in Example 41 except that purified water supplemented with the surface activator as a suspended solvent in the particles 2 was used at 65° C. Tg of the resin components of the particles 6 was 95° C. In SEM observation, the surface of the particles 6 was confirmed to have irregularities having a circle equivalent diameter of approximately 150 nm. However, polymerization was initiated before suspension into the predetermined oil spot diameter due to too high reaction rate of the polymerization initiator and increased the monomer viscosity. As a result, the particles were confirmed to be indefinite in shape without having a substantially spherical shape.

To charge the particles, both groups of particles were mixed and stirred in equal amounts for frictional electrification.

The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. The information display panel observed through the glass substrate displayed a black color. Next, a voltage was applied thereto to give reverse potentials. As a result, both groups of particles flied in reverse directions, and the information display panel displayed a white color. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 180 V.

Comparative Example 43

To prepare positively charged particles, 3 parts by weight of nigrosine compound (Bontoron N07, manufactured by Orient Chemical Industries, Ltd.) as a positive charge control agent having a poor solubility for monomer was dispersed with a sand mill in 60 parts by weight of methyl methacrylate monomer (KANTO CHEMICAL's reagent) and 40 parts by weight (about 25 mol %) of ethylene glycol dimethacrylate (Wako Pure Chemical's reagent) as multifunctional monomer having a plurality of polymerization reactive groups in one molecule. 12.5 parts by weight of master batch comprising 40 parts by weight of carbon black (MA100; manufactured by Mitsubishi Chemical Corp.) as black inorganic pigment (coloring agent) dispersed in advance in 60 parts by weight of methacrylic resin (Delpet 560F, manufactured by Asahi Kasei Corp.) as well as 5 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was dissolved therein. Then, 2 parts by weight of lauyl peroxide (PEROYL L, manufactured by NOF CORPORATION; ten hours half period temperature 61.6° C.) as acyl peroxide was further dissolved therein over 30 minutes to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule. The product was filtered and dried. Then, a classifier (MDS-2: NIPPON PNEUMATIC MFG. CO., LTD.) was used to thereby obtain particles 7 ranging from 0.5 to 50 μm in particle diameter and having an average particle diameter of 9.8 μm. Tg of the resin components of the particles 1 was 100° C. In SEM observation, the surface of the particles 7 was confirmed to have irregularities having a circle equivalent diameter of approximately 100 nm but was indefinite in shape without having a substantially spherical shape.

To prepare negatively charged particles, 5 parts by weight of phenolic condensate (Bontoron E89: produced by Orient Chemical Industries, Ltd.) as a negative charge control agent having a poor solubility for monomer was dispersed with a sand mill in 60 parts by weight of styrene monomer (KANTO CHEMICAL's reagent) and 40 parts by weight (about 35 mol %) of divinylbenzene (DVB-960, manufactured by Nippon Steel Chemical Co., Ltd.) as multifunctional monomer having a plurality of polymerization reactive groups in one molecule. 25 parts by weight of master batch comprising 80 parts by weight of titanium oxide (TIPAQUE CR-50, manufactured by ISHIHARA SANGYO KAISHA, LTD.) as white inorganic pigment (coloring agent) dispersed in advance in 20 parts by weight of methacrylic resin (Delpet 560F, manufactured by Asahi Kasei Corp.) as well as 5 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was dissolved therein. Then, 2 parts by weight of lauryl peroxide (PEROYL L, manufactured by NOF CORPORATION; ten hours half period temperature 61.6° C.) as acyl peroxide was further dissolved therein over 30 minutes to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule. The product was filtered and dried. Then, a classifier (MDS-2: NIPPON PNEUMATIC MFG. CO., LTD.) was used to thereby obtain particles 8 ranging from 0.5 to 50 μm in particle diameter and having an average particle diameter of 9.5 μm. Tg of the resin components of the particles 8 was 95° C. In SEM observation, the surface of the particles 8 was confirmed to have irregularities having a circle equivalent diameter of approximately 150 nm but was indefinite in shape without having a substantially spherical shape.

To charge the particles, both groups of particles were mixed and stirred in equal amounts for frictional electrification.

The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. The information display panel observed through the glass substrate displayed a black color. Next, a voltage was applied thereto to give reverse potentials. As a result, both groups of particles flied in reverse directions, and the information display panel displayed a white color. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 170 V.

Comparative Example 44

To prepare positively charged particles, the production of particles was attempted in totally the same way as in Example 41 except that t-butyl peroxyisobutylate (Perbutyl IB, manufactured by NOF CORPORATION; ten hours half period temperature 77.3° C.) was used instead of lauryl peroxide (PEROYL L, manufactured by NOF CORPORATION; ten hours half period temperature 61.6° C.) as acyl peroxide in the particles 1. However, the monomer was not hardened due to too slow reactivity of the polymerization initiator and formed no particles.

To prepare negatively charged particles, the production of particles was attempted in totally the same way as in Example 41 except that t-butyl peroxyisobutylate (Perbutyl IB, manufactured by NOF CORPORATION; ten hours half period temperature 77.3° C.) was used instead of lauryl peroxide (PEROYL L, manufactured by NOF CORPORATION; ten hours half period temperature 61.6° C.) as acyl peroxide in the particles 2. However, the monomer was not hardened due to too slow reactivity of the polymerization initiator and formed no particles.

Example 42

To prepare positively charged particles, particles 9 ranging from 0.5 to 50 μm in particle diameter and having an average particle diameter of 9.0 mm were obtained in totally the same way as in Example 41 except that azobisdimethylvaleronitrile (V-66, manufactured by Wako Pure Chemical Industries, Ltd.; 10 hours half period temperature 51° C.) as azo material having ten or more of carbon number in one molecule was used instead of lauryl peroxide (PEROYL L, manufactured by NOF CORPORATION; ten hours half period temperature 61.6° C.) as acyl peroxide in the particles 1. Tg of the resin components of the particles 9 was 100° C. In SEM observation, the surface of the particles 9 was confirmed to have irregularities having a circle equivalent diameter of approximately 200 nm.

To prepare negatively charged particles, particles 10 ranging from 0.5 to 50 µm in particle diameter and having an average particle diameter of 9.6 µm were obtained in totally the same way as in Example 41 except that azobisdimethylvaleronitrile (V-66, manufactured by Wako Pure Chemical Industries, Ltd.; 10 hours half period temperature 51° C.) as azo material having ten or more of carbon number in one molecule was used instead of lauryl peroxide (PEROYL L, manufactured by NOF CORPORATION; ten hours half period temperature 61.6° C.) as acyl peroxide in the particles 2. Tg of the resin components of the particles 10 was 95° C. In SEM observation, the surface of the particles 10 was confirmed to have irregularities having a circle equivalent diameter of approximately 200 nm.

To charge the particles, both groups of particles were mixed and stirred in equal amounts for frictional electrification.

The mixed particles were filled at a volume occupied rate of 30% into a cell made of substrates arranged via 100 µm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. The information display panel observed through the glass substrate displayed a black color. Next, a voltage was applied thereto to give reverse potentials. As a result, both groups of particles flied in reverse directions, and the information display panel displayed a white color. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 110 V.

Comparative Example 45

To prepare positively charged particles, particles 11 ranging from 0.5 to 50 µm in particle diameter and having an average particle diameter of 9.9 µm were obtained in totally the same way as in Example 41 except that azobisisobutyronitrile (V-60, manufactured by Wako Pure Chemical Industries, Ltd.; 10 hours half period temperature 65° C.) as azo material having ten or less of carbon number in one molecule was used instead of lauryl peroxide (PEROYL L, manufactured by NOF CORPORATION; ten hours half period temperature 61.6° C.) as acyl peroxide in the particles 1. Tg of the resin components of the particles 11 was 100° C. In SEM observation, the surface of the particles 11 was confirmed to have irregularities having a circle equivalent diameter of approximately 200 nm. Fine particles as by-products from emulsion polymerization attributed to insufficient hydrophobicity of the polymerization initiator could not completely be separated by classification and were therefore observed therein.

To prepare negatively charged particles, particles 12 ranging from 0.5 to 50 rpm in particle diameter and having an average particle diameter of 9.6 µm were obtained in totally the same way as in Example 41 except that azobisisobutyronitrile (V-60, manufactured by Wako Pure Chemical Industries, Ltd.; 10 hours half period temperature 65° C.) as azo material having ten or less of carbon number in one molecule was used instead of lauryl peroxide (PEROYL L, manufactured by NOF CORPORATION; ten hours half period temperature 61.6° C.) as acyl peroxide in the particles 2. Tg of the resin components of the particles 12 was 95° C. In SEM observation, the surface of the particles 12 was confirmed to have irregularities having a circle equivalent diameter of approximately 200 nm. Fine particles as by-products from emulsion polymerization attributed to insufficient hydrophobicity of the polymerization initiator could not completely be separated by classification and were therefore observed therein.

To charge the particles, both groups of particles were mixed and stirred in equal amounts for frictional electrification.

The mixed particles were filled at a volume occupied rate of 30% into a cell made of substrates arranged via 100 µm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. The information display panel observed through the glass substrate displayed a black color. Next, a voltage was applied thereto to give reverse potentials. As a result, both groups of particles flied in reverse directions, and the information display panel displayed a white color. In both cases, the particles desired to be displayed on the ITO glass substrate were not contaminated with the particles having the other color, producing excellent display quality. Moreover, reflectance was measured in each display state obtained at gradually varied applied voltages. However, a voltage at which the ratio between the reflectance during the display of a white color and the reflectance during the display of a black color became 8 folds was not found in a voltage range of not more than 500 V due to reduction in contrast attributed to the fine particles.

Example 43

To prepare positively charged particles, particles 13 ranging from 0.5 to 50 µm in particle diameter and having an average particle diameter of 9.8 µm were obtained in totally the same way as in Example 41 except that styrene acrylic resin (Stylac AS-767, manufactured by Asahi Kasei Corp.) as (acrylic or methacrylic) resin-hydrocarbon resin copolymer was used instead of (acrylic or methacrylic) resin-fluorocarbon resin block copolymer (MODIPER F600, manufactured by NOF CORPORATION) in the particles 1. Tg of the resin components of the particles 13 was 100° C. In SEM observation, the surface of the particles 13 was confirmed to have irregularities having a circle equivalent diameter of approximately 150 nm.

To prepare negatively charged particles, particles 14 ranging from 0.5 to 50 mm in particle diameter and having an average particle diameter of 9.2 μm were obtained in totally the same way as in Example 41 except that styrene acrylic resin (Stylac AS-767, manufactured by Asahi Kasei Corp.) as (acrylic or methacrylic) resin-hydrocarbon resin copolymer was used instead of (acrylic or methacrylic) resin-fluorocarbon resin block copolymer (MODIPER F600, manufactured by NOF CORPORATION) in the particles 2. Tg of the resin components of the particles 14 was 95° C. In SEM observation, the surface of the particles 14 was confirmed to have irregularities having a circle equivalent diameter of approximately 150 nm.

To charge the particles, both groups of particles were mixed and stirred in equal amounts for frictional electrification.

The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. The information display panel observed through the glass substrate displayed a black color. Next, a voltage was applied thereto to give reverse potentials. As a result, both groups of particles flied in reverse directions, and the information display panel displayed a white color. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a black color became 8 folds was determined as a drive voltage. As a result, the voltage was 110 V.

Example 44

To prepare positively charged particles, particles 15 were obtained in totally the same way as in Example 41 except that iron oxide (TAROX R-516, manufactured by Titan Kogyo KK) as a red coloring agent was used instead of carbon black (MA100, manufactured by Mitsubishi Chemical Corp.) as black inorganic pigment (coloring agent) in the particles 1. Particles of not more than 500 nm were not confirmed. In SEM observation, the surface of the particles 15 was confirmed to have irregularities having a circle equivalent diameter of approximately 100 nm.

The particles 2 described in Example 41 were used as negatively charged particles.

To charge the particles, both groups of particles were mixed and stirred in equal amounts for frictional electrification.

The mixed particles were filled at a volume occupied rate of 30% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. The information display panel observed through the glass substrate displayed a red color. Next, a voltage was applied thereto to give reverse potentials. As a result, both groups of particles flied in reverse directions, and the information display panel displayed a white color. In both cases, the particles desired to be displayed on the ITO glass substrate were not contaminated with the particles having the other color, producing excellent display quality. Moreover, reflectance was measured in each display state obtained at gradually varied applied voltages. A voltage at which the ratio between the reflectance during the display of a white color and the reflectance during the display of a red color became 8 folds was determined as a drive voltage. As a result, the voltage was 125 V.

In conclusion, the particles for display media of Examples 41, 42, 43, and 44 had minute irregularities formed evenly on their surface and required a low drive voltage. Therefore, they were demonstrated to be particles for display media hardly causing poor display.

On the other hand, the particles for display media of Comparative Example 41 had no minute irregularities formed on their surface and required a high drive voltage when used as display media. Therefore, they were demonstrated to be particles for display media easily causing poor display. The particles for display media of Comparative Examples 42 and 43 had minute irregularities, albeit without having a substantially spherical shape, formed on their surface and required a high drive voltage when used as display media. Therefore, they were demonstrated to be particles for display media hardly causing poor display. In Comparative Example 44, particle formation itself could not be achieved. The particles for display media of Comparative Example 45 had minute irregularities formed on their surface, and however, the particles could not completely be separated and remained. Furthermore, a drive voltage was not found due to reduction in contrast attributed to the fine particles. Therefore, they were demonstrated to be particles for display media hardly causing poor display.

(8) Variation 8

The structure of the particles for display media of the present invention, comprising the particles having a substantially spherical shape, which are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and which have minute irregularities on their surface evenly can be constructed so that charge control agents and pigments are evenly dispersed in one molecule and certainly coated with a resin without being exposed at the outermost surface.

The structure of the particles thus constructed, in which charge control agents and pigments are evenly dispersed in one molecule and certainly coated with a resin without being exposed at the outermost surface, can solve the problem of the unevenness of the particles or the instability of their charge characteristics. Thus, even particles for display media having stability in their charge characteristics can be obtained for the reasons shown below.

When the pigments have poor dispersibility, that is, when aggregates exist in the polymerized particles, the coloring properties of the particles themselves, such as black or white chromaticity, are reduced to a great extent as compared with those comprising evenly dispersed pigments, even if the same amounts of pigments are used. When the charge control agents have poor dispersibility, the exceedingly uneven distribution of charges occurs in an area having the aggregated charge control agents in one particle; or otherwise, a phenomenon takes place in which the particles lose their charge characteristics due to the charge control agents detached from the particle surface. The resulting particles have poor driving properties. Furthermore, when the inorganic pigments or charge control agents are not coated with resins, conduction occurs in the uncoated area. The resulting particles lose their charge retention performance and become those undriven in the information display panel of the present invention, that is, become undesirable as the particles for display media used for an information display panel.

An information display panel utilizing, as display media, the particles for display media of the present invention can reduce variations in surface properties attributed to friction. Therefore, the information display panel has no reduction in display contrast or response rate during repetitive display rewriting. Thus, an information display panel can be obtained not only is excellent in endurance of display properties or display rewiring properties but also can drive the display media by an electrostatic field at a low applied voltage.

The structure of the particles for display media is measured by use of an electron microscope, atomic force microscope, electron spectroscopy, and transmission electron microscope. Moreover, the particle size distribution of dispersoids in the mixed solution for production is measured by use of a particle size distribution analyzer LA-920 manufactured by HORIBA Ltd.

Hereinafter, the variation 8 will be described more specifically with reference to Examples as embodiments of the present invention and Comparative Examples.

Example 51

To prepare positively charged particles, 2 parts by weight of nigrosine compound (Bontoron N07, manufactured by Orient Chemical Industries, Ltd.) as a positive charge control agent having a poor solubility for monomer as well as 12.5 parts by weight of master batch comprising 40 parts by weight of carbon black (MA100; manufactured by Mitsubishi Chemical Corp.) as black inorganic pigment (coloring agent) dispersed in advance in 60 parts by weight of acrylic resin (Delpet 80NH, manufactured by Asahi Kasei Corp.) was dispersed by treatment with a sand mill for 4 hours in 60 parts by weight of methyl methacrylate monomer (KANTO CHEMICAL's reagent) and 60 parts by weight of ethylene glycol dimethacrylate (Wako Pure Chemical's reagent) as multifunctional monomer having a plurality of polymerization reactive groups in one molecule. 5 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was further dissolved therein. The particle size distribution of dispersoids in the mixed solution (dispersion liquid) thus produced was measured by use of a particle size distribution analyzer LA-920 manufactured by HORIBA Ltd. The obtained results were an arithmetic mean particle diameter of 253 nm and an arithmetic standard deviation of 347 nm.

Next, 2 parts by weight of lauryl peroxide (PEROYL L, manufactured by NOF CORPORATION; ten hours half period temperature 61.6° C.) as acyl peroxide was dissolved in this mixed solution to thereby obtain a solution. This solution was suspended and subjected to polymerization in purified water (40° C.) supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule. The product was filtered and dried. Then, a classifier (MDS-2: NIPPON PNEUMATIC MFG. CO., LTD.) was used to thereby obtain black particles ranging from 0.5 to 50 μm in particle diameter and having an average particle diameter of 9.8 μm. In SEM observation, the surface of the particles was confirmed to have irregularities having a circle equivalent diameter of approximately 100 nm. In composition analysis on the particle surface using an electron spectroscopy, fluorine components were detected. Next, the particles were cut, and their internal structure was observed with a transmission electron microscope. As a result, neither a mass of the aggregated pigments or charge control agents nor their exposure at the surface was observed.

To prepare negatively charged particles, 5 parts by weight of phenolic condensate (Bontoron E89: produced by Orient Chemical Industries, Ltd.) as a negative charge control agent having a poor solubility for monomer as well as 25 parts by weight of titanium oxide (TIPAQUE CR-50, manufactured by ISHIHARA SANGYO KAISHA, LTD.) as white inorganic pigment (coloring agent) was dispersed by treatment with a sand mill for 4 hours in 60 parts by weight of styrene monomer (KANTO CHEMICAL's reagent) and 40 parts by weight of divinylbenzene (DVB-960, manufactured by Nippon Steel Chemical Co., Ltd.) as multifunctional monomer having a plurality of polymerization reactive groups in one molecule. 5 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was dissolved therein. The particle size distribution of dispersoids in the mixed solution (dispersion liquid) thus produced was measured by use of a particle size distribution analyzer LA-920 manufactured by HORIBA Ltd. The obtained results were an arithmetic mean particle diameter of 330 nm and an arithmetic standard deviation of 461 nm.

Next, 2 parts by weight of lauryl peroxide (PEROYL L, manufactured by NOF CORPORATION; ten hours half period temperature 61.6° C.) as acyl peroxide was dissolved in this solution to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator. The product was filtered and dried. Then, a classifier (MDS-2: NIPPON PNEUMATIC MFG. CO., LTD.) was used to thereby obtain white particles ranging from 0.5 to 50 μm in particle diameter and having an average particle diameter of 10.4 μm. In SEM observation, the surface of the particles was confirmed to have irregularities having a circle equivalent diameter of approximately 150 nm. In composition analysis on the particle surface using an electron spectroscopy, fluorine components were detected. Moreover, the particles were cut, and their internal structure was observed with a transmission electron microscope. As a result, neither a mass of the aggregated pigments or charge control agents nor their exposure at the surface was observed.

To charge the particles, both groups of particles were mixed and stirred in equal amounts for frictional electrification. The mixed particles were filled at a volume occupied rate of 11% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. The information display panel displayed a black color through the glass substrate. Next, a voltage was applied thereto to give reverse potentials. As a result, both groups of particles flied in reverse directions, and the information display panel displayed a white color. In both cases, the particles desired to be displayed on the ITO glass substrate were not contaminated with the particles having the other to color, producing excellent display quality. The contrast ratio (ratio between the reflectance during the display of a white color and the reflectance during the display of a black color) was measured by use of a Macbeth densitometer D19. As a result, the contrast ratio and was 8.5. The results are shown in Table 2 below.

In examples shown below, evaluation was conducted by use of information display panels, all of which were produced by the same procedures as above, unless otherwise specified. The results are summarized in Table 2 below.

Example 52

To prepare positively charged particles, 0.5 parts by weight of nigrosine compound (Bontoron N07, manufactured by Orient Chemical Industries, Ltd.) as a positive charge control agent having a poor solubility for monomer as well as 12.5 parts by weight of master batch comprising 40 parts by weight of carbon black (MA100; manufactured by Mitsubishi Chemical Corp.) as black inorganic pigment (coloring agent) dispersed in advance in 60 parts by weight of acrylic resin (Delpet 80NH, manufactured by Asahi Kasei Corp.) was dispersed by treatment with a sand mill for 4 hours in 100 parts by weight of ethylene glycol dimethacrylate (Wako Pure Chemical's reagent). 10 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was further dissolved therein. Next, 2 parts by weight of lauryl peroxide (PEROYL L, manufactured by NOF CORPORATION; ten hours half period temperature 61.6° C.) as acyl peroxide was dissolved in this solution to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule. The product was filtered and dried. Then, a classifier (MDS-2: NIPPON PNEUMATIC MFG. CO., LTD.) was used to thereby obtain black particles.

To prepare negatively charged particles, 5 parts by weight of phenolic condensate (Bontoron E89: produced by Orient Chemical Industries, Ltd.) as a negative charge control agent having a poor solubility for monomer as well as 25 parts by weight of master batch comprising 80 parts by weight of titanium oxide (TIPAQUE CR-50, manufactured by ISHIHARA SANGYO KAISHA, LTD.) as white inorganic pigment (coloring agent) dispersed in advance in 20 parts by weight of methacrylic resin (Delpet 560F, manufactured by Asahi Kasei Corp.) was dispersed by treatment with a sand mill for 4 hours in 60 parts by weight of styrene monomer (KANTO CHEMICAL's reagent) and 40 parts by weight of ethylene glycol dimethacrylate (Wako Pure Chemical's reagent) as multifunctional monomer having a plurality of polymerization reactive groups in one molecule. 5 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was dissolved therein. Next, 2 parts by weight of lauryl peroxide (PEROYL L, manufactured by NOF CORPORATION; ten hours half period temperature 61.6° C.) as acyl peroxide was dissolved in this solution to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule. The product was filtered and dried. Then, a classifier was used to thereby obtain white particles.

Comparative Example 51

To prepare positively charged particles, 2 parts by weigh: of nigrosine compound (Bontoron N07, manufactured by Orient Chemical industries. Ltd.) as a positive charge control agent having a poor solubility for monomer as well as 5 parts by weight of carbon black (MA100; manufactured by Mitsubishi Chemical Corp.) as black inorganic pigment (coloring agent) was dispersed by treatment with a sand mill for 1 hour in 60 parts by weight of methyl methacrylate monomer (KANTO CHEMICAL's reagent) and 60 parts by weight of ethylene glycol dimethacrylate (Wako Pure Chemical's reagent) as multifunctional monomer having a plurality of polymerization reactive groups in one molecule. 1 part by weight of (acrylic or methacrylic) resin-fluorocarbon resin block copolymer (MODIPER F600, manufactured by NOF CORPORATION) as (acrylic or methacrylic) resin-hydrocarbon resin copolymer was further dissolved therein. Next, 2 parts by weight of lauryl peroxide (PEROYL L, manufactured by NOF CORPORATION; ten hours half period temperature 61.6° C.) as acyl peroxide was dissolved in this solution to thereby obtain a solution. This solution was suspended and subjected to polymerization in purified water (40° C.) supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule. The product was filtered and dried. Then, a classifier (MDS-2: NIPPON PNEUMATIC MFG. CO., LTD.) was used to thereby obtain black particles.

To prepare negatively charged particles, 5 parts by weight of phenolic condensate (Bontoron E89: produced by Orient Chemical Industries, Ltd.) as a negative charge control agent having a poor solubility for monomer as well as 120 parts by weight of titanium oxide (TIPAQUE CR-50, manufactured by ISHIHARA SANGYO KAISHA, LTD.) as white inorganic pigment (coloring agent) was dispersed by treatment with a sand mill for 4 hours in 60 parts by weight of styrene monomer (KANTO CHEMICAL's reagent) and 40 parts by weight of divinylbenzene (DVB-960, manufactured by Nippon Steel Chemical Co., Ltd.) as multifunctional monomer having a plurality of polymerization reactive groups in one molecule. 5 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was dissolved therein. Next, 2 parts by weight of lauryl peroxide (PEROYL L, manufactured by NOF CORPORATION; ten hours half period temperature 61.6° C.) as acyl peroxide was dissolved in this solution to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator. The product was filtered and dried. Then, a classifier (MDS-2: NIPPON PNEUMATIC MFG. CO., LTD.) was used to thereby obtain white particles.

Comparative Example 52

To prepare positively charged particles, 2 parts by weight of nigrosine compound (Bontoron N07, manufactured by Orient Chemical Industries, Ltd.) as a positive charge control agent having a poor solubility for monomer as well as 5 parts by weight of carbon black (MA100; manufactured by Mitsubishi Chemical Corp.) as black inorganic pigment (coloring agent) was dispersed by treatment with a sand mill for 1 hour in 100 parts by weight of ethylene glycol dimethacrylate (Wako Pure Chemical's reagent). 1 part by weight of (acrylic or methacrylic) resin-fluorocarbon resin block copolymer (MODIPER F600, manufactured by NOF CORPORATION) as (acrylic or methacrylic) resin-hydrocarbon resin copolymer was further dissolved therein. Next, 2 parts by weight of lauryl peroxide (PEROYL L, manufactured by NOF CORPORATION; ten hours half period temperature 61.6° C.) as acyl peroxide was dissolved in this solution to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule. The product was filtered and dried. Then, a classifier (MDS-2: NIPPON PNEUMATIC MFG. CO., LTD.) was used to thereby obtain black particles.

To prepare negatively charged particles, 5 parts by weight of phenolic condensate (Bontoron E89: produced by Orient Chemical Industries, Ltd.) as a negative charge control agent having a poor solubility for monomer as well as 80 parts by weight of titanium oxide (TIPAQUE CR-50, manufactured by ISHIHARA SANGYO KAISHA, LTD.) as white inorganic pigment (coloring agent) was dispersed by treatment with a sand mill for 1 hour in 100 parts by weight of styrene monomer (KANTO CHEMICAL's reagent). 1 part by weight of (acrylic or methacrylic) resin-fluorocarbon resin block copolymer (MODIPER F600, manufactured by NOF CORPORATION) as (acrylic or methacrylic) resin-hydrocarbon resin copolymer was dissolved therein. Next, 2 parts by weight of lauryl peroxide (PEROYL L, manufactured by NOF CORPORATION; ten hours half period temperature 61.6° C.) as acyl peroxide was dissolved in this solution to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator. The product was filtered and dried. Then, a classifier (MDS-2: NIPPON PNEUMATIC MFG. CO., LTD.) was used to thereby obtain white particles.

TABLE 2

| | | | Example 51 | Example 52 | Comparative Example 51 | Comparative Example 52 |
|---|---|---|---|---|---|---|
| Black particles | Mixed solution | Arithmetic mean particle diameter (nm) | 253 | 248 | 650 | 671 |
| | | Arithmetic standard deviation (nm) | 347 | 320 | 707 | 682 |
| | Summary | Particle diameter (μm) | 9.8 | 9.3 | 9.5 | 9.0 |
| | | SEM observed surface irregularities (nm) | 100 | 100 | Absent | Absent |
| | TEM observation | Aggregation mass (maximum size) | Absent | Absent | Present (1.5 μm) | Present (1.5 μm) |
| | | Filler exposure at surface | Absent | Absent | Present | Present |
| | Surface composition | Fluorine detection | Present | Present | Absent | Absent |
| White particles | Mixed solution | Arithmetic mean particle diameter (nm) | 330 | 320 | 763 | 699 |
| | | Arithmetic standard deviation (nm) | 461 | 495 | 793 | 631 |
| | Summary | Particle diameter (μm) | 10.4 | 10.1 | 10.2 | 9.9 |
| | | SEM observed surface irregularities (nm) | 150 | 180 | Absent | Absent |
| | TEM observation | Aggregation mass (maximum size) | Absent | Absent | Present (2.2 μm) | Present (1.8 μm) |
| | | Filler exposure at surface | Absent | Absent | Present | Present |
| | Surface composition | Fluorine detection | Present | Present | Absent | Absent |
| Construction | Distance (μm) between substrates | | 100 | 100 | 100 | 100 |
| | Gas in space between substrates | Dew-point temperarure (° C.) | 5 | 5 | 5 | 5 |
| | | Pressure (KPa) | 101.3 | 101.3 | 101.3 | 101.3 |

TABLE 2-continued

|  |  | Example 51 | Example 52 | Comparative Example 51 | Comparative Example 52 |
|---|---|---|---|---|---|
|  | Kind | Air | Air | Air | Air |
|  | Volume occupied rate (vol %) of display media | 11 | 11 | 11 | 11 |
| Performance | White/black contrast ratio | 8.5 (excellent) | 9.5 (excellent) | 2.3 (poor) | 2.1 (poor) |

(9) Variation 9

The particles for display media of the present invention, comprising the particles having a substantially spherical shape, which are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and which have minute irregularities on their surface evenly can be constructed so that, in terms of a component ratio, the particles include 4 phr carbon black, with respect to the particle-constituting resin, having a primary particle diameter of not more than 30 (nm) and a DBP absorption of not more than 120 (cm$^3$/100 g) and include charge control agents in an amount of not more than 60% of that of the carbon black.

By such a construction, black particles for display media having high black chromaticity can be obtained. Therefore, an information display panel utilizing, as display media, the black particles for display media of the present invention has no reduction in display contrast or response rate during repetitive display rewriting. Thus, an information display panel can be obtained which not only is excellent in endurance of display properties or display rewiring properties but also can drive the display media by an electrostatic field at a low applied voltage.

In the variation 9 of the present invention, DBP absorption measurement is a general method used for determining carbon structure, wherein the DBP absorption shows the connection between the particles or the degree of structure according to aggregation from an amount of DBP (Dibutyl phthalate) required for filling the voids of deposited carbon black and is indicated in ml/100 g as a unit. The larger this value gets, the higher the carbon structure becomes. By contrast, the smaller the value gets, the lower the carbon structure becomes.

Hereinafter, the variation 9 will be described more specifically with reference to Examples as embodiments of the present invention and Comparative Examples.

Example 61

To prepare positively charged particles, 1 part by weight of nigrosine compound (Bontoron N07, manufactured by Orient Chemical Industries, Ltd.) as a positive charge control agent having a poor solubility for monomer as well as 14 parts by weight of master batch comprising 40 parts by weight of carbon black (MA100; manufactured by Mitsubishi Chemical Corp.; primary particle diameter 24 nm, DBP absorption 100 ml/g) as black inorganic pigment (coloring agent) dispersed in advance in 60 parts by weight of acrylic resin (Delpet 80NH, manufactured by Asahi Kasei Corp.) was dispersed by treatment with a sand mill for 1 hour in 40 parts by weight of methyl methacrylate monomer (KANTO CHEMICAL's reagent) and 60 parts by weight of ethylene glycol dimethacrylate (Wako Pure Chemical's reagent) as multifunctional monomer having a plurality of polymerization reactive groups in one molecule. 10 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was further dissolved therein.

Next, 2 parts by weight of azobisdimethylvaleronitrile (V-65, manufactured by Wako Pure Chemical Industries, Ltd.; 10 hours half period temperature 51° C.) as azo material having ten or more of carbon number in one molecule was dissolved in this mixed solution to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator including polyoxyalkylene chain and sulfonate in the molecule. The product was filtered and dried. Then, a classifier (MDS-2: NIPPON PNEUMATIC MFG. CO., LTD.) was used to thereby obtain black particles ranging from 0.5 to 50 μm in particle diameter and having an average particle diameter of 9.3 μm. In SEM observation, the surface of the particles was confirmed to have irregularities having a circle equivalent diameter of approximately 90 nm.

To prepare negatively charged particles, 5 parts by weight of phenolic condensate (Bontoron E89: produced by Orient Chemical Industries, Ltd.) as a negative charge control agent having a poor solubility for monomer as well as 40 parts by weight of titanium oxide (TIPAQUE CR-50, manufactured by ISHII-LARA SANGYO KAISHA, LTD.) as white inorganic pigment (coloring agent) was dispersed by treatment with a sand mill for 4 hours in 60 parts by weight of styrene monomer (KANTO CHEMICAL's reagent) and 40 parts by weight of divinylbenzene (DVB-960, manufactured by Nippon Steel Chemical Co., Ltd.) as multifunctional monomer having a plurality of polymerization reactive groups in one molecule. 8 parts by weight of (acrylic or methacrylic) resin-fluorocarbon resin block copolymer (MODIPER F600, manufactured by NOF CORPORATION) as (acrylic or methacrylic) resin-hydrocarbon resin copolymer was dissolved therein.

Next, 2 parts by weight of lauryl peroxide (PEROYL L, manufactured by NOF CORPORATION; ten hours half period temperature 61.6° C.) as acyl peroxide was dissolved in this solution to thereby obtain a solution. This solution was suspended and subjected to polymerization in purified water supplemented with 0.5 wt % of sodium polyoxyethylene alkyl ether sulfate (LATEMURU E-118B, manufactured by KAO CORPORATION) as a surface activator. The product was filtered and dried. Then, a classifier (MDS-2: NIPPON PNEUMATIC MFG. CO., LTD.) was used to thereby obtain white particles ranging from 0.5 to 50 μm in particle diameter and having an average particle diameter of 10.1 μm. In SEM observation, the surface of the particles was confirmed to have irregularities having a circle equivalent diameter of approximately 140 nm.

The mixed particles were filled at a volume occupied rate of 11% into a cell made of substrates arranged via 100 μm spacers, one of which was a glass substrate treated on its inner surface with ITO and connected to power and the other of which was a copper substrate, to thereby obtain an information display panel. The ITO glass substrate and the copper substrate were respectively connected to power. A 250 V direct voltage was applied thereto so that the ITO glass substrate and the copper substrate were at a low potential and at a high potential, respectively. As a result, the positively charged particles and the negatively charged particles flied toward the poles with a low potential and with a high potential, respectively. The information display panel observed through the glass substrate displayed a black color. Next, a voltage was applied thereto to give reverse potentials. As a result, both groups of particles flied in reverse directions, and the observed information display panel displayed a white color. In both cases, the particles desired to be displayed on the ITO glass substrate were not contaminated with the particles having the other color, producing excellent display quality. The contrast ratio (ratio between the reflectance during the display of a white color and the reflectance during the display of a black color) was measured by use of a Macbeth densitometer D19. As a result, the contrast ratio was 9.5.

Example 62

Two groups of particles were produced according to totally the same procedures as in Example 61 except that carbon black (MA77, manufactured by Mitsubishi Chemical Corp.) having a primary particle diameter of 23 nm and a DBP absorption of 68 ml/g was used in Example 61. An information display panel was prepared with these particles and evaluated. The contrast ratio at a voltage of 250 V was 10.2.

Comparative Example 61

Two groups of particles were produced according to totally the same procedures as in Example 61 except that carbon black (#20, manufactured by Mitsubishi Chemical Corp.) having a primary particle diameter of 50 nm and a DBP absorption of 121 ml/g was used in Example 61. An information display panel was prepared with these particles and evaluated. The contrast ratio at a voltage of 250 V was 5.8.

Comparative Example 62

Two groups of particles were produced according to totally the same procedures as in Comparative Example 61 except that charge control agents were not added to the positively charged particles in Comparative Example 61. An information display panel was prepared with these particles and evaluated. The contrast ratio at a voltage of 250 V was 1.3.

Comparative Example 63

Two groups of particles were produced according to totally the same procedures as in Example 61 except that carbon black (#3050B, manufactured by Mitsubishi Chemical Corp.) having a primary particle diameter of 50 nm and a DBP absorption of 175 ml/g was used in Example 61. An information display panel was prepared with these particles and evaluated. The contrast ratio at a voltage of 250 V was 4.6.

(10) Variation 10

The particles for display media of the present invention, comprising the particles having a substantially spherical shape, which are made by polymerizing raw materials including monomers, which include (acrylic or methacrylic) resin-hydrocarbon resin copolymer in the particles, in which a part of or all of the monomers are a multifunctional monomer having a plurality of polymerization reactive groups in one molecule, and which have minute irregularities on their surface evenly can be constructed so that a ratio R60/R0 of the average particle diameter of the particles before and after heat treatment at 60° C. is 0.66<R60/R0<1.5.

By such a construction, variations in diameter or charge amount attributed to heating can be controlled optimally to prevent the amount and depth of surface irregularities from being insufficient due to contraction and thereby causing lack of a charge amount or prevent a substrate-particle attaching force from getting strong. Therefore, an information display panel utilizing, as display media, the particles for display media of the present invention has no reduction in display contrast or response rate during repetitive display rewriting. Thus, an information display panel can be obtained which not only is excellent in endurance of display properties or display rewiring properties but also can drive the display media by an electrostatic field at a low applied voltage.

INDUSTRIAL APPLICABILITY

An information display panel utilizing particles for display media of the present invention is preferably used in: display units for mobile equipment such as notebook personal computers, PDAs, cellular phones, and bandy terminals; electric papers such as electric books and electric newspapers; bulletin boards such as signboards, posters, and blackboards; image display units for electric calculator, home electric application products, auto supplies, and so on; card display units such as point cards and IC cards; and display units for electric advertisements, electric POPs, electric price tags, electric shelf tags, electric musical score, RF-ID device, and so on.

The invention claimed is:

1. Particles for display media, comprising:
particles having a substantially spherical shape, and comprised of polymerized raw materials, wherein the raw materials to be polymerized comprise (a) monomers and (b) an acrylic or methacrylic resin-hydrocarbon resin copolymer, in which a part of or all of the monomers are a multifunctional monomer having a plurality of polymerization reactive groups in one molecule, and which have minute irregularities on their surfaces.

2. The particles for display media according to claim 1, wherein the minute irregularities is constituted by concave and convex portions having a circle equivalent diameter of 0.01-0.5 μm.

3. The particles for display media according to claim 1, wherein a resin constituting the particles is formed by polymerizing one or more monomers at least selected from acrylic monomer, methacrylic monomer and styrene monomer.

4. The particles for display media according to claim 1, wherein an amount of the multifunctional monomer is not less than 15 mol % in the monomers.

5. The particles for display media according to claim 1, wherein all of the monomers are the functional monomer.

6. The particles for display media according to claim 1, wherein the multifunctional monomer is acrylic monomer or methacrylic monomer.

7. The particles for display media according to claim 1, wherein the particles are formed according to a suspension polymerization by suspending the particle raw material in a suspended solvent including not more than 10 wt % of at least one or more of suspension fixing agents and polymerizing the suspended matter.

8. The particles for display media according to claim 7, wherein the suspension fixing agents include polyoxyalkylene chain in the molecule.

9. The particles for display media according to claim 7, wherein the suspension fixing agents include polyoxyalkylene chain and sulfate.

10. The particles for display media according to claim 7, wherein the suspension fixing agents are a water soluble resin.

11. The particles for display media according to claim 7, wherein the suspension fixing agents are powders made of inorganic particles having a particle diameter of 10-1000 nm.

12. The particles for display media according to claim 1, wherein a polymerization initiator having ten hours half period temperature of 40-75° C.

13. The particles for display media according to claim 12, wherein the polymerization initiator is acryl peroxide.

14. The particles for display media according to claim 12, wherein the polymerization initiator is azo material having ten or more of carbon number in one molecule.

15. The particles for display media according to claim 1, wherein the acrylic or methacrylic resin-hydrocarbon resin copolymer is acrylic or methacrylic resin-hydrocarbon resin block copolymer.

16. The particles for display media according to claim 1, wherein the hydrocarbon resin of the acrylic or methacrylic resin-hydrocarbon resin copolymer is polystyrene resin.

17. The particles for display media according to claim 1, wherein the hydrocarbon resin of the acrylic or methacrylic resin-hydrocarbon resin copolymer is fluorocarbon resin.

18. The particles for display media according to claim 1, wherein the particle raw materials include coloring agents, to which a surface treatment is performed, or, which are formed as a master batch.

19. The particles for display media according to claim 18, wherein one or more materials selected from inorganic pigment, organic pigment and organic dye are used as the coloring agents, to which the surface treatment is performed, or, which are formed as the master batch.

20. The particles for display media according to claim 1, wherein the particle raw materials include a material having an object for charging the particles.

21. The particles for display media according to claim 20, wherein at least one material selected from charge control agents having a poor solubility for monomers, charge control agents having a solubility and monomers capable of copolymerization having chargeable functional group in a molecule.

22. The particles for display media according to claim 1, wherein a resin having Tg of not less than 60° C. or a resin in which Tg is not observed, is used as the resin constituting the particles.

23. The particles for display media according to claim 1, wherein a particle diameter of the particles is 0.5-50 μ.m.

24. The particles for display media according to claim 1, wherein a color of the particles is a white color.

25. The particles for display media according to claim 1, wherein a color of the particles is a black color.

26. The particles for display media according to claim 1, wherein remaining amount after sieving of the particles formed by polymerizing the particle raw materials is not more than 20%, and the even minute irregularities on the surface of the particle has BET specific surface area of 5-150 $m^2/g$.

27. The particles for display media according to claim 1, wherein, in the case of deforming the particles by applying a pressure thereto, a force necessary for deforming the particles by 10% is not less than 1 mN.

28. An information display panel, in which display media are sealed between two substrates, at least one of two substrates being transparent, and, in which the display media, to which an electrostatic field is applied, are made to move so as to display information,
wherein the display media comprises particles for display media as set forth in claim 1.

29. A method of producing particles for display media constituting the display media, used for an information display panel, in which the display media are sealed between two substrates, at least one of two substrates being transparent, and, in which the display media, to which an electrostatic field is applied, are made to move so as to display information, comprising the steps of:
preparing particle raw materials including monomers, which include acrylic or methacrylic resin-hydrocarbon resin copolymer, in which a part of or all of the monomers are multifunctional polymerization reactive groups in one molecule;
suspending the prepared particle raw materials in a suspended solvent including at least one or more surface activators; and
polymerizing the particle raw materials so as to obtain substantially spherical particles;
in which:
the particle raw materials are suspended in the suspended solvent to be an oil spot having a diameter larger than a predetermined oil spot diameter;
a material having an effect of starting or promoting the polymerization by dissolving it, under such a condition that ten hours half period temperature is not more than 75° C., is added in the suspended solvent;
a step of suspending the particle raw materials to a predetermined oil spot diameter and a step of dispersing the material are performed simultaneously; and
a polymerization is performed so as to obtain particles for display media having an even minute irregularities on the surface of the particles.

* * * * *